United States Patent
Shlyakhov et al.

(10) Patent No.: US 12,113,996 B2
(45) Date of Patent: Oct. 8, 2024

(54) ARRANGEMENT OF ADAPTIVE LOOP FILTER COEFFICIENTS FOR FAST VECTORIZED TRANSPOSITIONS

(71) Applicant: Tencent America LLC, Palo Alto, CA (US)

(72) Inventors: Nikolay Shlyakhov, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 90 days.

(21) Appl. No.: 17/983,921

(22) Filed: Nov. 9, 2022

(65) Prior Publication Data

US 2023/0179764 A1 Jun. 8, 2023

Related U.S. Application Data

(60) Provisional application No. 63/286,530, filed on Dec. 6, 2021.

(51) Int. Cl.
*H04N 19/42* (2014.01)
*H04N 19/117* (2014.01)
(Continued)

(52) U.S. Cl.
CPC ......... *H04N 19/439* (2014.11); *H04N 19/117* (2014.11); *H04N 19/159* (2014.11);
(Continued)

(58) Field of Classification Search
CPC .. H04N 19/423; H04N 19/433; H04N 19/439; H04N 19/80; H04N 19/82; H04N 19/117
See application file for complete search history.

(56) References Cited

U.S. PATENT DOCUMENTS

2009/0003451 A1 1/2009 Lin et al.
2010/0074330 A1* 3/2010 Fu .................. H04N 19/436
375/240.12
(Continued)

FOREIGN PATENT DOCUMENTS

CN 113475070 A 10/2021
JP 5555707 B2 7/2014
(Continued)

OTHER PUBLICATIONS

Wenbin Yin et al., EE2-related: Adaptive Filter Shape Selection for ALF , Joint Video Experts Team (JVET) of ITU-T SG 16 WP 3 and ISO/IEC JTC 1/SC 29, 24th Meeting, by teleconference, Oct. 6-15, 2021, Document: JVET-X0086-v2, pp. 1-5.
(Continued)

*Primary Examiner* — David N Werner
(74) *Attorney, Agent, or Firm* — ARENTFOX SCHIFF LLP

(57) ABSTRACT

A filter with a central symmetric shape is applied to a current block. The filter includes a plurality of coefficients. Each of the plurality of coefficients is associated with a respective first coordinate value along a first axis and a respective second coordinate value along a second axis. The plurality of coefficients of the filter is grouped into a plurality of groups based on a transposition operation to be performed on the filter. The coefficients in each of the plurality of groups is a same distance from a center position of the filter. The coefficients of a first group of the plurality of groups are reordered based on the transposition operation. Filtered samples of the current block are reconstructed by applying the filter with the central symmetric shape to the current block based on the reordered coefficients of the filter.

20 Claims, 23 Drawing Sheets

(51) Int. Cl.
*H04N 19/159* (2014.01)
*H04N 19/176* (2014.01)
*H04N 19/423* (2014.01)
*H04N 19/433* (2014.01)
*H04N 19/44* (2014.01)
*H04N 19/80* (2014.01)
*H04N 19/82* (2014.01)

(52) U.S. Cl.
CPC ......... *H04N 19/176* (2014.11); *H04N 19/423* (2014.11); *H04N 19/433* (2014.11); *H04N 19/44* (2014.11); *H04N 19/80* (2014.11); *H04N 19/82* (2014.11)

(56) References Cited

U.S. PATENT DOCUMENTS

| | | | |
|---|---|---|---|
| 2012/0320989 A1 | 12/2012 | Ameres et al. | |
| 2013/0142267 A1* | 6/2013 | Esenlik | H04N 19/423 382/260 |
| 2013/0301742 A1* | 11/2013 | Cheung | H04N 19/439 375/240.29 |
| 2014/0341308 A1* | 11/2014 | Nandan | H04N 19/80 375/240.29 |
| 2015/0003520 A1* | 1/2015 | Mody | H04N 19/436 375/240.08 |
| 2019/0238865 A1* | 8/2019 | Han | H04N 19/129 |
| 2020/0084444 A1* | 3/2020 | Egilmez | H04N 19/423 |
| 2021/0235127 A1* | 7/2021 | Chen | H04N 19/156 |
| 2022/0141477 A1* | 5/2022 | Kim | H04N 19/82 375/240.12 |
| 2024/0056606 A1* | 2/2024 | Piao | H04N 19/82 |

FOREIGN PATENT DOCUMENTS

| | | | |
|---|---|---|---|
| KR | 102257829 B1 | 5/2021 | |
| TW | 202005376 A | 1/2020 | |
| WO | WO-2021133236 A1 * | 7/2021 | ........... H04N 19/105 |

OTHER PUBLICATIONS

M. Karczewicz et al., "VVC In-Loop Filters," in IEEE Transactions on Circuits and Systems for Video Technology, vol. 31, No. 10, pp. 3907-3925, Oct. 2021, pp. 1-19.

Intel Architecture Instruction Set Extensions and Future Features, Programming Reference, May 2021, 319433-044, pp. 1-214.

ITU-T Study Group. "Versatile video coding, Series H: Audiovisual and multimedia systems: Infrastructure of audiovisual services-coding of moving video." in General Secretariat and Telecom Radiocommunication (ITU-R) Standardization (ITU-T), sec. H 266, Aug. 2020, pp. 1-516.

Yao-Jen Chang et al., Compression efficiency methods beyond VVC, Joint Video Experts Team (JVET) of ITU-T SG 16 WP 3 and ISO/IEC JTC 1/SC 29, 21st Meeting, by teleconference, Jan. 6-15, 2021, Document: JVET-J0100, pp. 1-13.

International Search Report and Written Opinion issued in International Application No. PCT/US2022/079758, mailed Feb. 1, 2023, 13 pages.

* cited by examiner

ARRANGEMENT OF ADAPTIVE LOOP FILTER COEFFICIENTS FOR FAST VECTORIZED TRANSPOSITIONS

INCORPORATION BY REFERENCE

The present application claims the benefit of priority to U.S. Provisional Application No. 63/286,530, "Arrangement of Adaptive Loop Filter Coefficients for Fast Vectorized Transpositions" filed on Dec. 6, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture partition. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry.

According to an aspect of the disclosure, a method of video decoding performed in a video decoder is provided. In the method, prediction information of a current block in a current picture can be received from a coded video bitstream. The prediction information can indicate that a filter with a central symmetric shape is applied to the current block. The filter can include a plurality of coefficients. Each of the plurality of coefficients can be associated with a respective first coordinate value along a first axis and a respective second coordinate value along a second axis. The plurality of coefficients of the filter can be grouped into a plurality of groups based on a transposition operation to be performed on the filter. The coefficients in each of the plurality of groups can be a same distance from a center position of the filter. The coefficients of a first group of the plurality of groups can be reordered based on the transposition operation. Filtered samples of the current block can be reconstructed by applying the filter with the central symmetric shape to the current block based on the reordered coefficients of the filter.

In the method, the reordered coefficients of the first group of the plurality of groups and the coefficients of a second group of the plurality of groups can be swapped. The reordered coefficients of the first group and the coefficients of the second group can be a first distance from the center position of the filter.

In some embodiments, the transposition operation can be one of a rotation operation, a vertical flip operation, or a diagonal flip operation.

In some embodiments, a number of the coefficients of the first group can be equal to a number of the coefficients of the second group.

The first distance can be equal to a sum of (i) an absolute value of the first coordinate value of a first coefficient of the first group and (ii) an absolute value of the second coordinate value of the first coefficient of the first group.

A sum of the first coordinate value of the first coefficient of the first group and the second coordinate value of a first coefficient of the second group can be equal to 0. The second coordinate value of the first coefficient of the first group can be equal to the first coordinate value of the first coefficient of the second group.

In an embodiment, the coefficients of each of the plurality of groups can be stored in a respective memory space. The respective memory space can have one of (i) a first storage volume equal to or less than 128 bits and (ii) a second storage volume equal to or less than 256 bits.

In an embodiment, the coefficients of one or more of the plurality of groups stored in a memory space, the memory space having one of (i) a first storage volume of 128 bits and (ii) a second storage volume of 256 bits.

In the method, each of the plurality of groups can have a corresponding group in the plurality of groups. The coefficients of the respective group of the plurality of groups and the coefficients of the corresponding group in the plurality of groups can be a same distance from the center position of the filter. The respective group of the plurality of groups and the corresponding group in the plurality of groups can include a same number of coefficients.

In the method, the plurality of coefficients of the filter can be determined based on the prediction information in an order signaled in the prediction information. The determined plurality of coefficients of the filter can further be grouped into the plurality of groups.

According to another aspect of the disclosure, an apparatus is provided. The apparatus includes processing circuitry. The processing circuitry can be configured to perform any of the methods for video encoding/decoding.

Aspects of the disclosure also provide a non-transitory computer-readable medium storing instructions which when executed by a computer for video decoding cause the computer to perform any of the methods for video encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
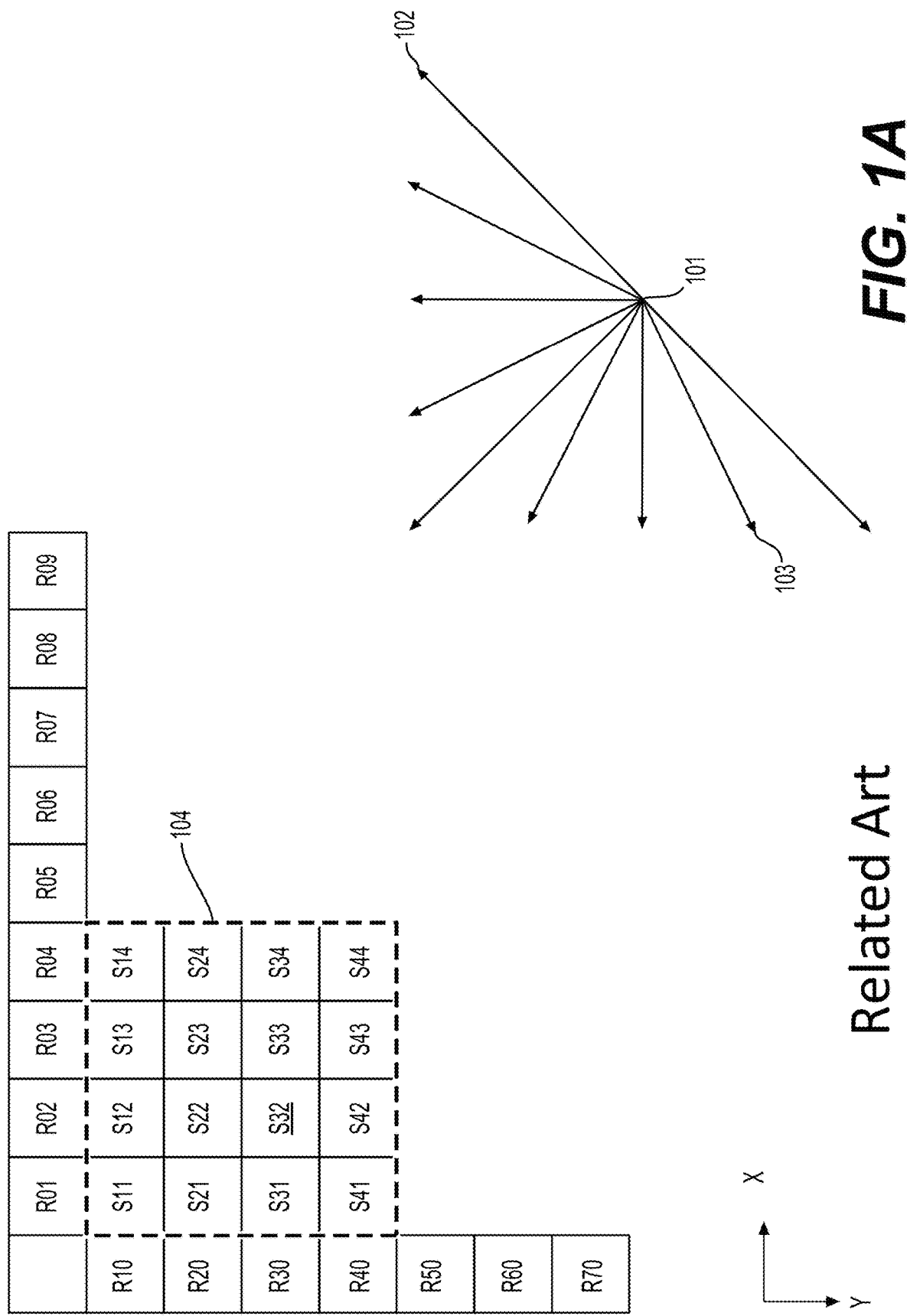
FIG. 1A is a schematic illustration of an exemplary subset of intra prediction modes.
Figure 1B:
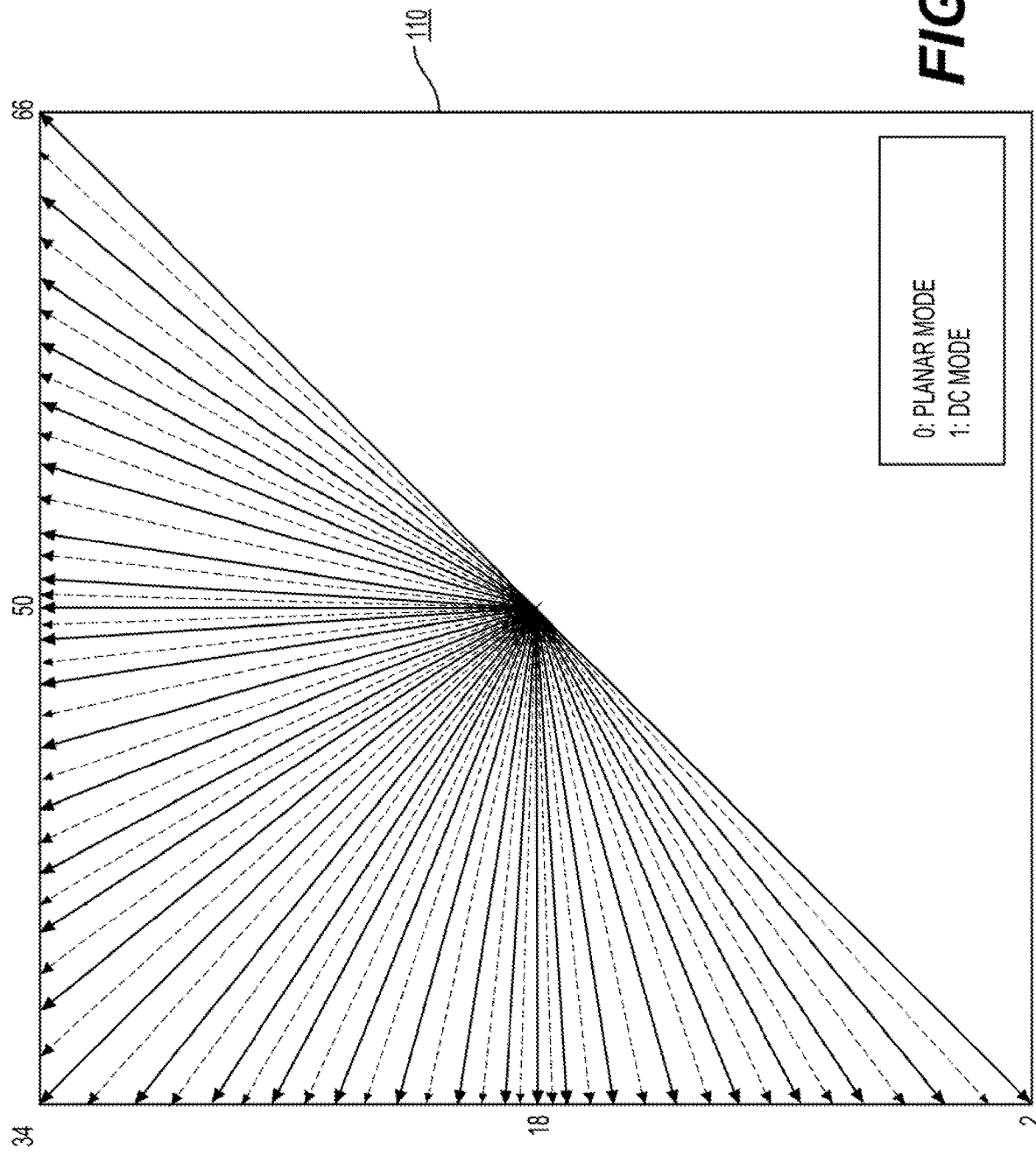
FIG. 1B is an illustration of exemplary intra prediction directions.
Figure 2:
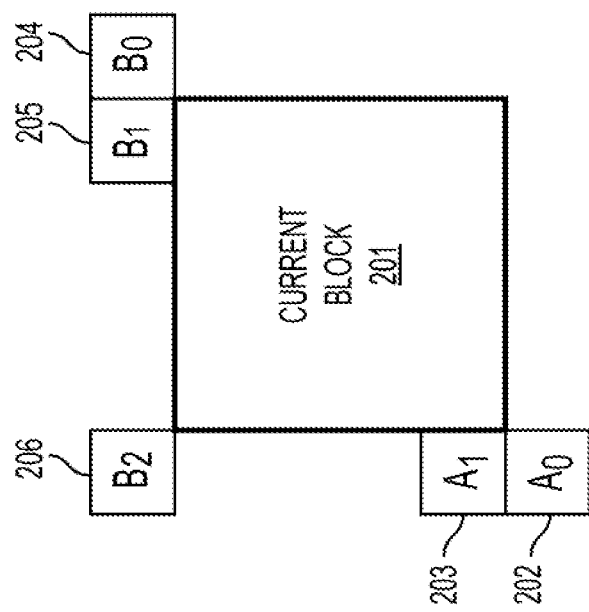
FIG. 2 is a schematic illustration of a current block and its surrounding spatial merge candidates in one example.
Figure 3:
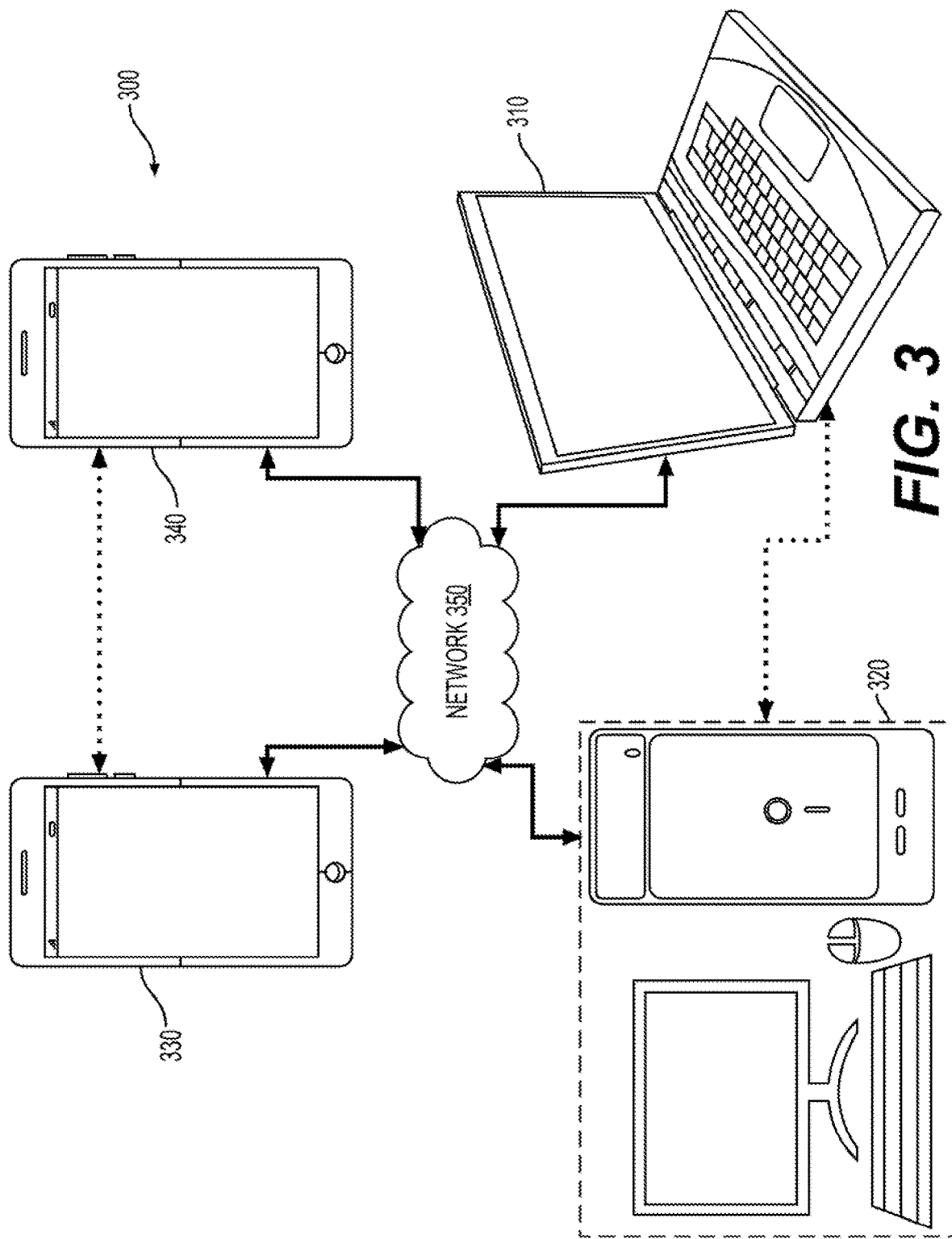
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
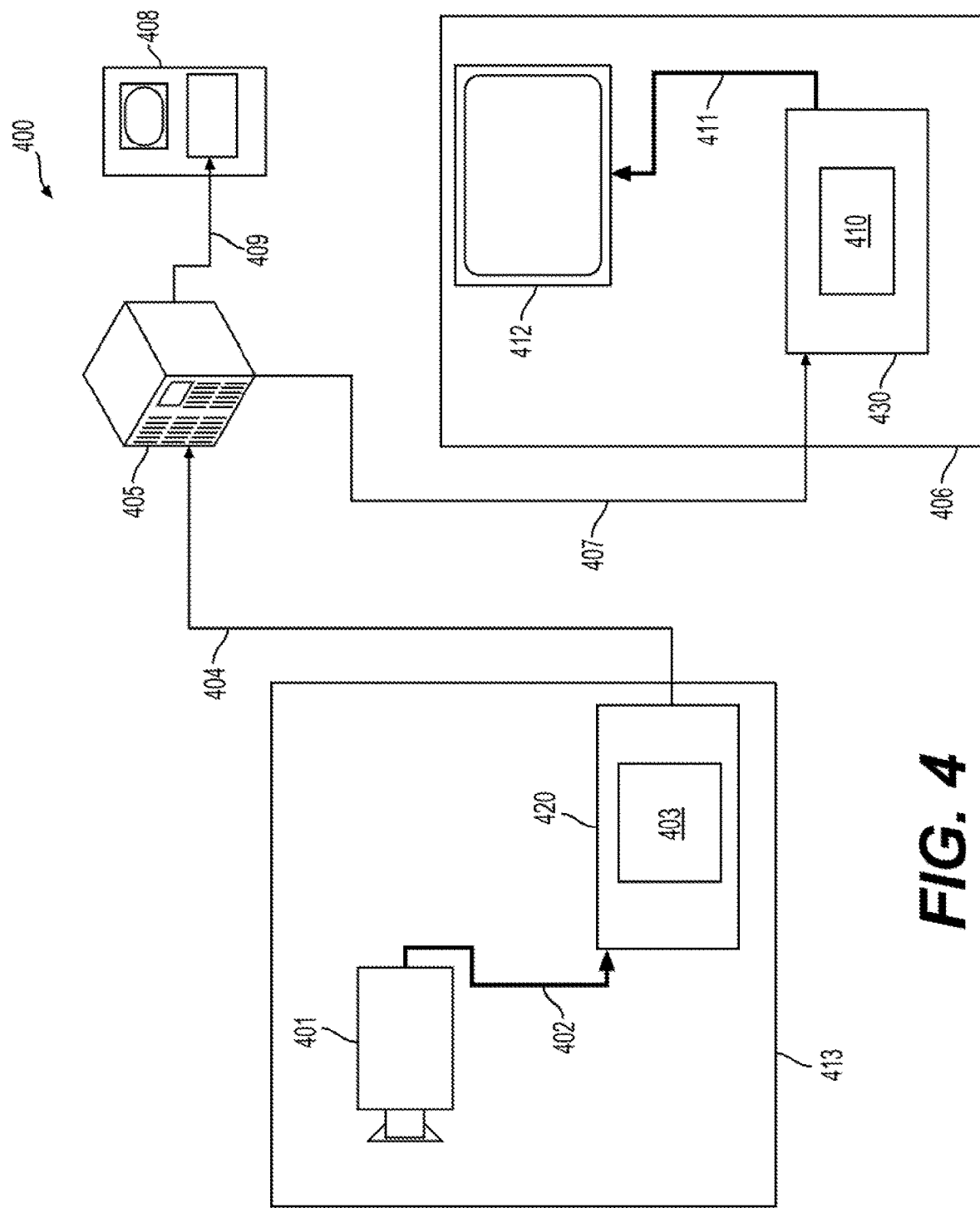
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
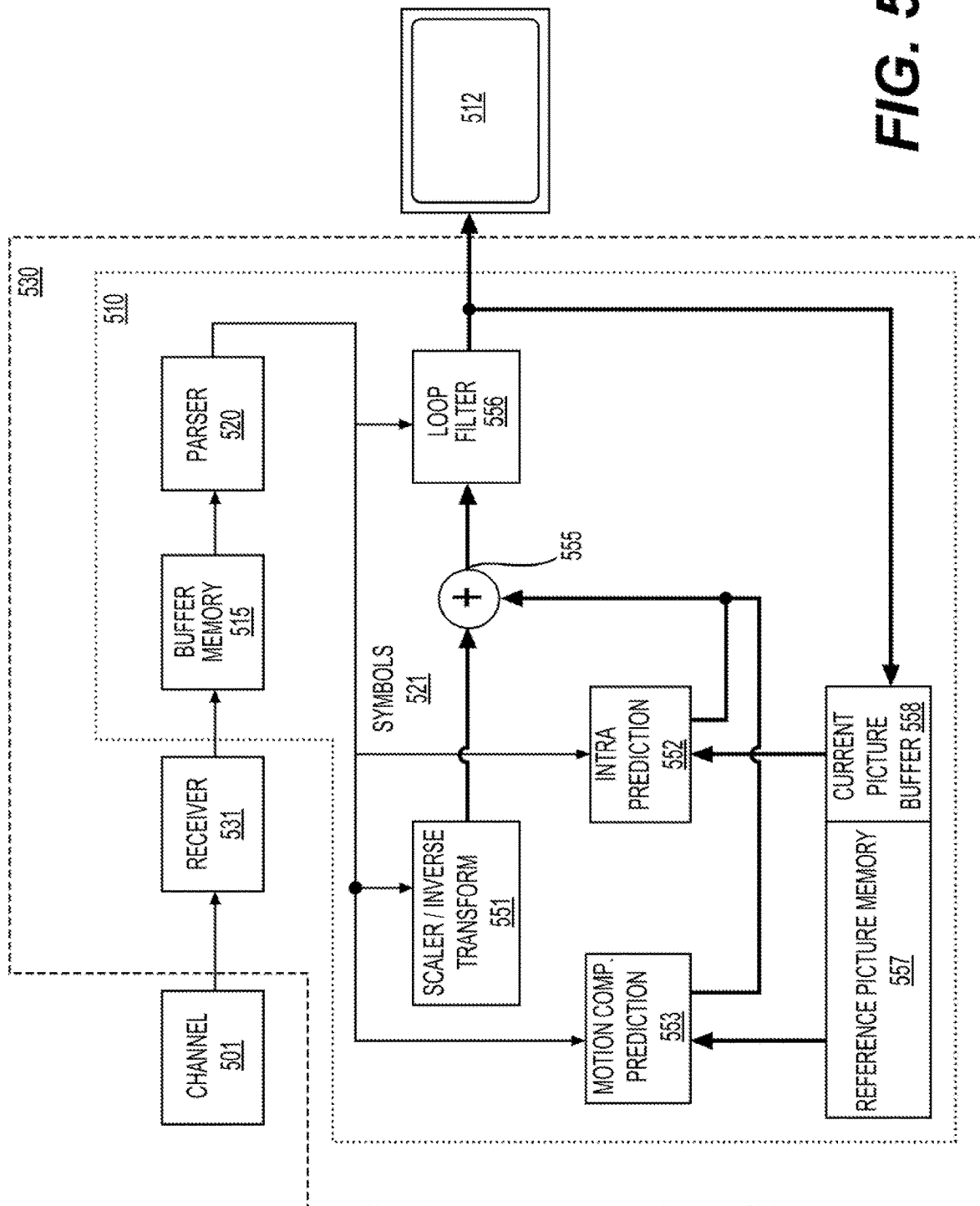
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG.

5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
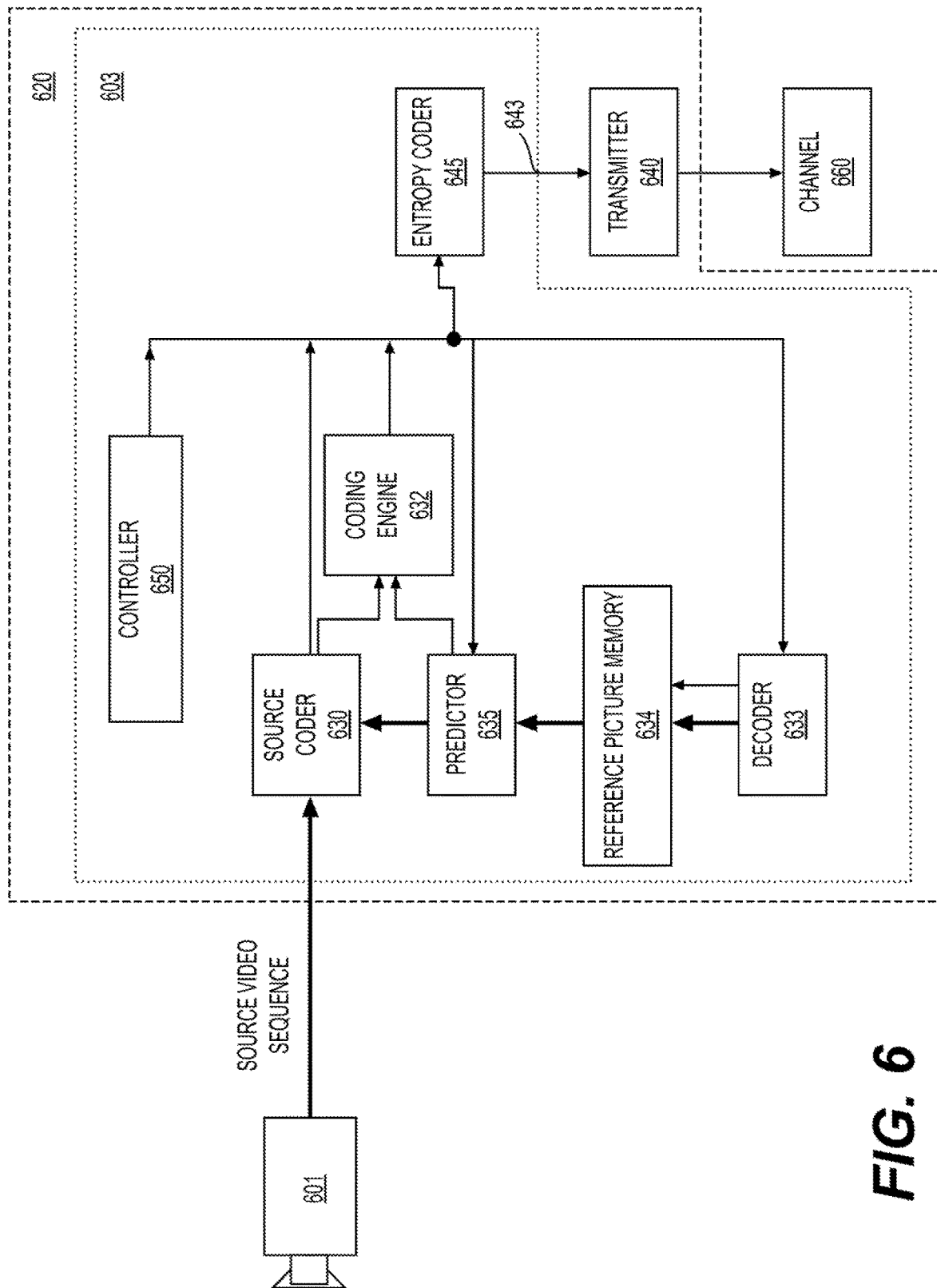
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
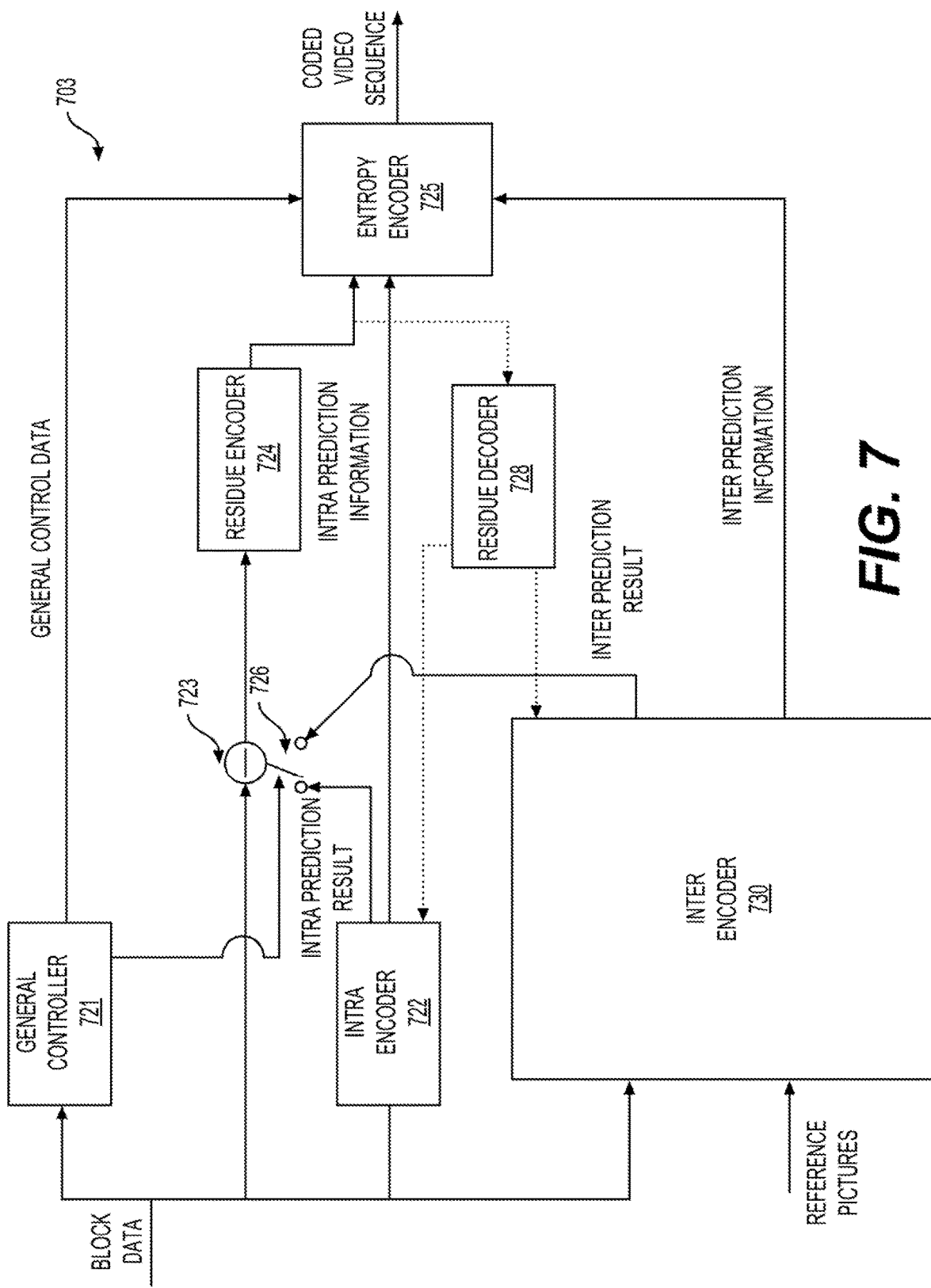
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
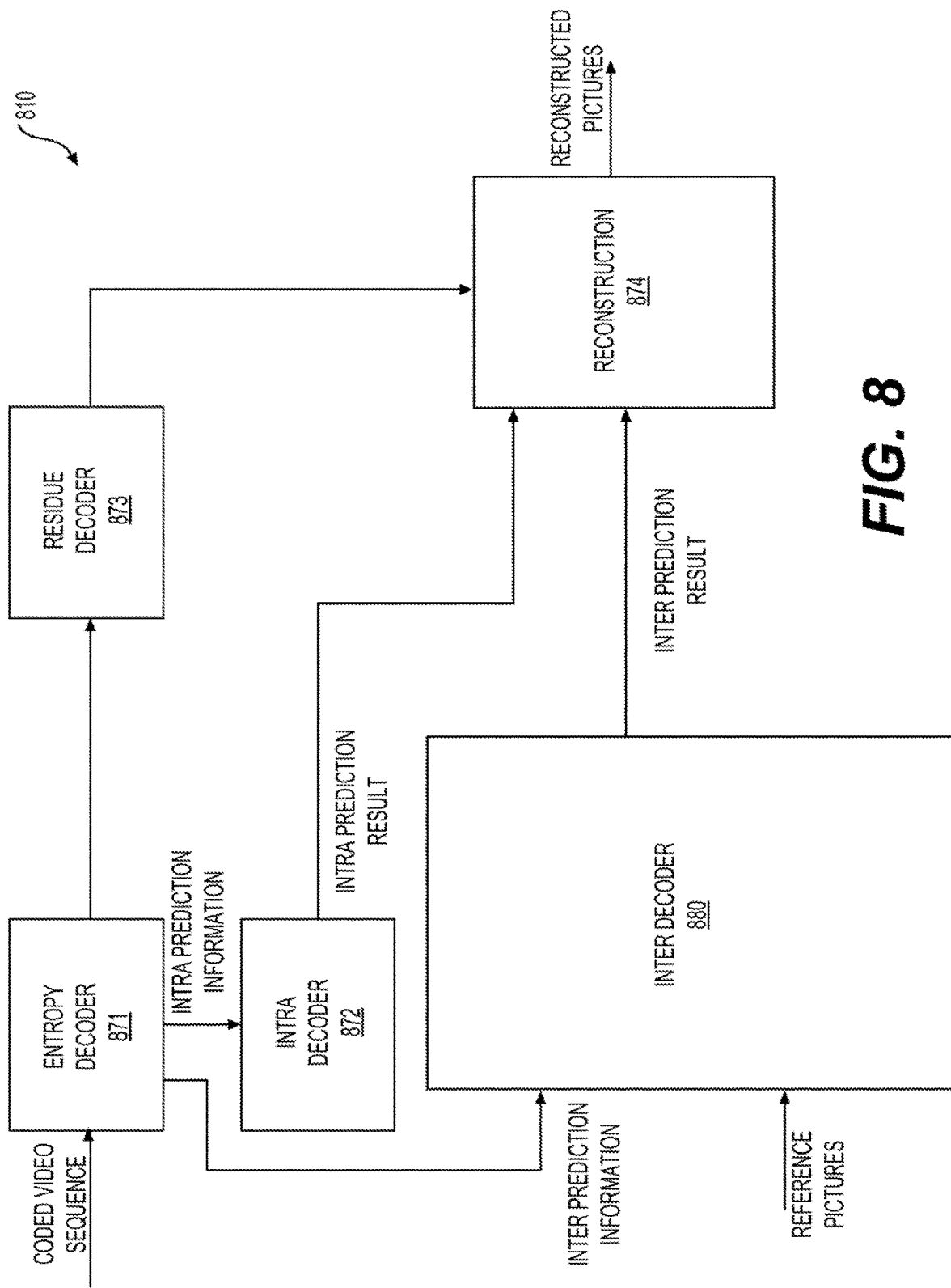
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

The disclosure includes embodiments related to adaptive loop filtering in video coding. The embodiments can include pre-arranging Adaptive Loop Filter (ALF) coefficients so that transpositions of the ALF coefficients can take minimal operations if the transpositions are implemented in a single instruction, multiple data (SIMD) vectorized form.

In April 2018, JVET formally launched a standardization process of next-generation video coding, the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the H.266/VVC video coding standard (version 1).

An adaptive Loop Filter, such as in the H.266/VVC Standard, can be applied to reconstructed pixels as a dot product of pixels on a diamond-shaped pattern. The ALF coefficients can have a bit depth of 16 bits for example. Correspondence between pixel values and coefficients on the diamond-shape pattern can be described in a formula, such as in a formula (1438) of the VVC standard, and depend on a transposition index. The transposition index can be derived by an algorithm, such as an algorithm described in section 8.8.5.3 of the VVC standard. ALF can have a central symmetry. Thus, ALF transpositions defined in H.266/VVC can involve 12 coefficients on the diamond-shaped pattern. Four transpositions or geometric transformations of ALF can be defined, such as in H.266/VVC. For example, a transposition with an index 0 can be a default or 'initial' transposition to keep coefficients in a parsing/decoding order, a transposition with an index 1 can be 'diagonal flip', a transposition with index 2 can be 'vertical flip', and a transposition with index 3 can be 'rotation'.

Figure 9:
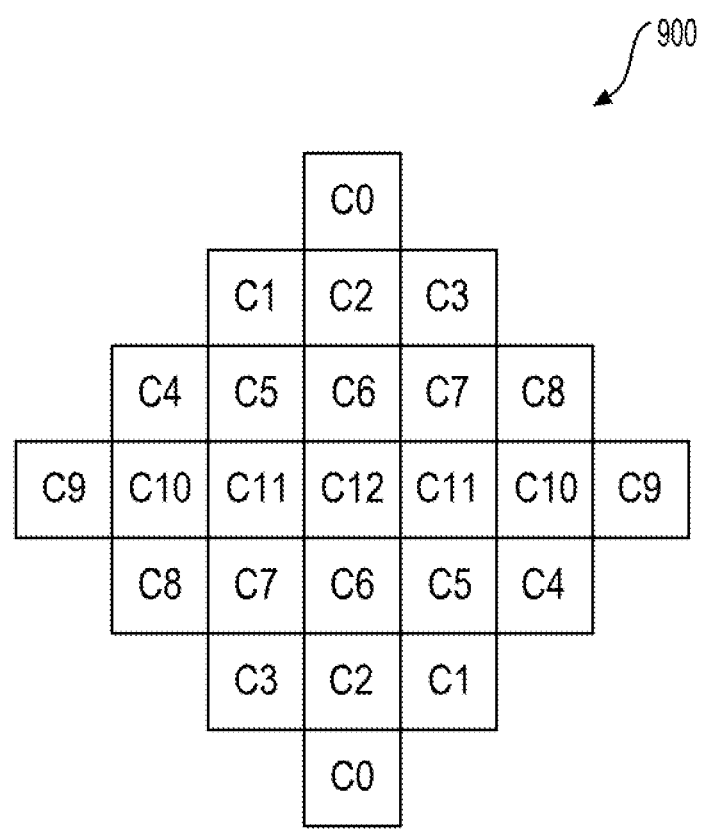
FIG. 9 is a schematic illustration of an exemplary adaptive loop filter (ALF) in accordance with some embodiments.

An initial or default placement of ALF coefficients on the diamond-shaped pattern can be provided in FIG. 9. As shown in FIG. 9, an ALF (900) can have coefficients C0-C12 that are positioned in a diamond-shaped pattern. According to a definition in an encoded bitstream of the H.266/VVC standard, coefficients of the ALF (900) can be encoded and decoded in an order from a $0^{th}$ (e.g., C0) to an $11^{th}$ (e.g., C11) according to the initial pattern shown in FIG. 9. A $12^{th}$ coefficient (e.g., C12) can be at a center of the ALF (900) and derived by values of the coefficients $0^{th}$ . . . $11^{th}$ for normalization of the filter (900).

In the H.266/VVC Standard, transpositions can be defined in formulae (1), (2), (3) and (4) according to mapping tables. Luma filter coefficients and clipping values index idx can be derived depending on a transposeIdx[x][y] as follows:

If transposeIdx[x][y] is equal to 1, the following applies:

$$idx[ \ ]=\{9,4,10,8,1,5,11,7,3,0,2,6\} \quad \text{Formula (1)}$$

Otherwise, if transposeIdx[x][y] is equal to 2, the following applies:

$$idx[ \ ]=\{0,3,2,1,8,7,6,5,4,9,10,11\} \quad \text{Formula (2)}$$

Otherwise, if transposeIdx[x][y] is equal to 3, the following applies:

$$idx[ \ ]=\{9,8,10,4,3,7,11,5,1,0,2,6\} \quad \text{Formula (3)}$$

Otherwise, the following applies:

$$idx[ \ ]=\{0,1,2,3,4,5,6,7,8,9,10,11\} \quad \text{Formula (4)}$$

Figure 10A:
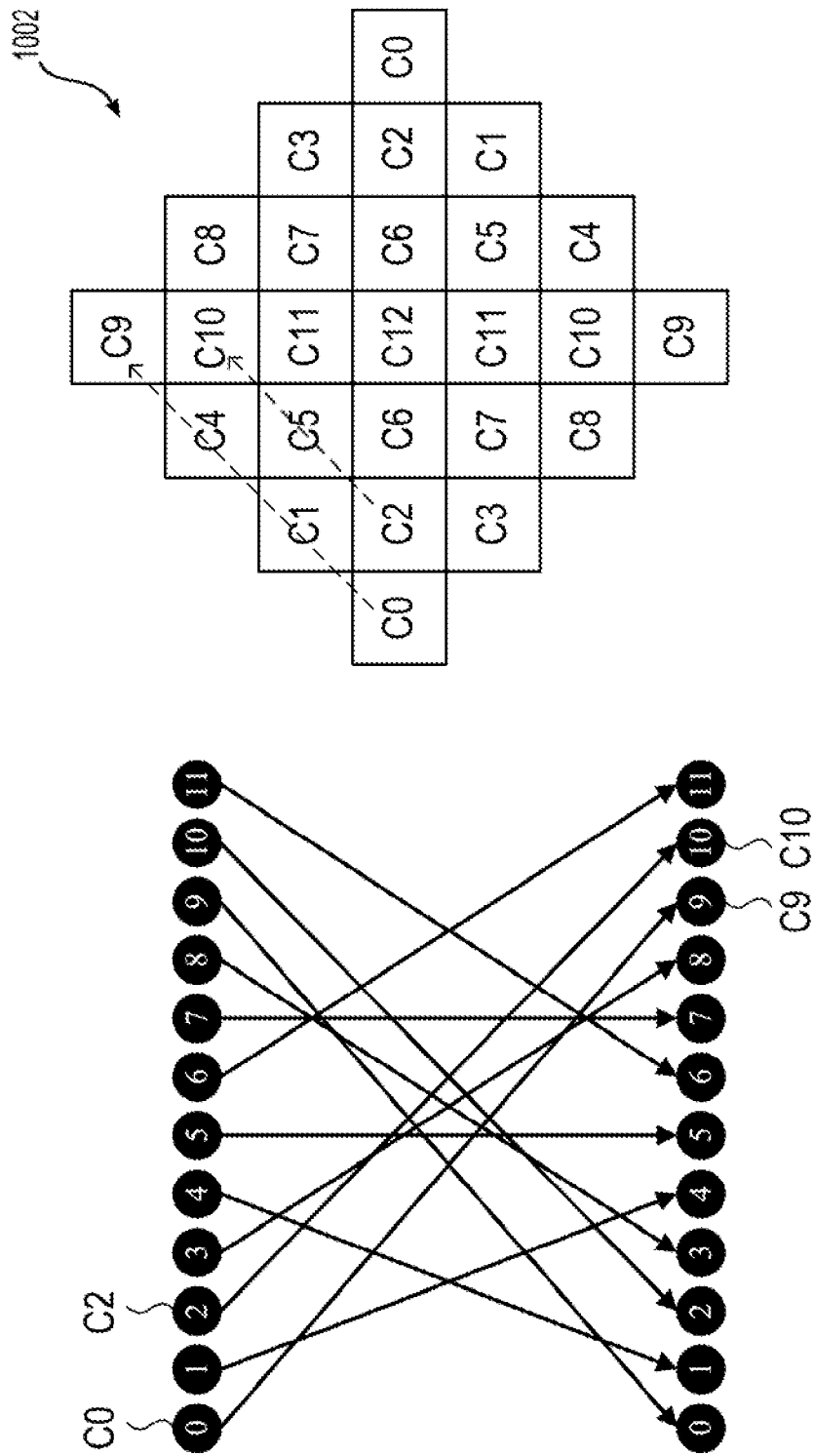
FIG. 10A is a schematic illustration of a first exemplary transposition of coefficients of an ALF in accordance with some embodiments.
Figure 10B:
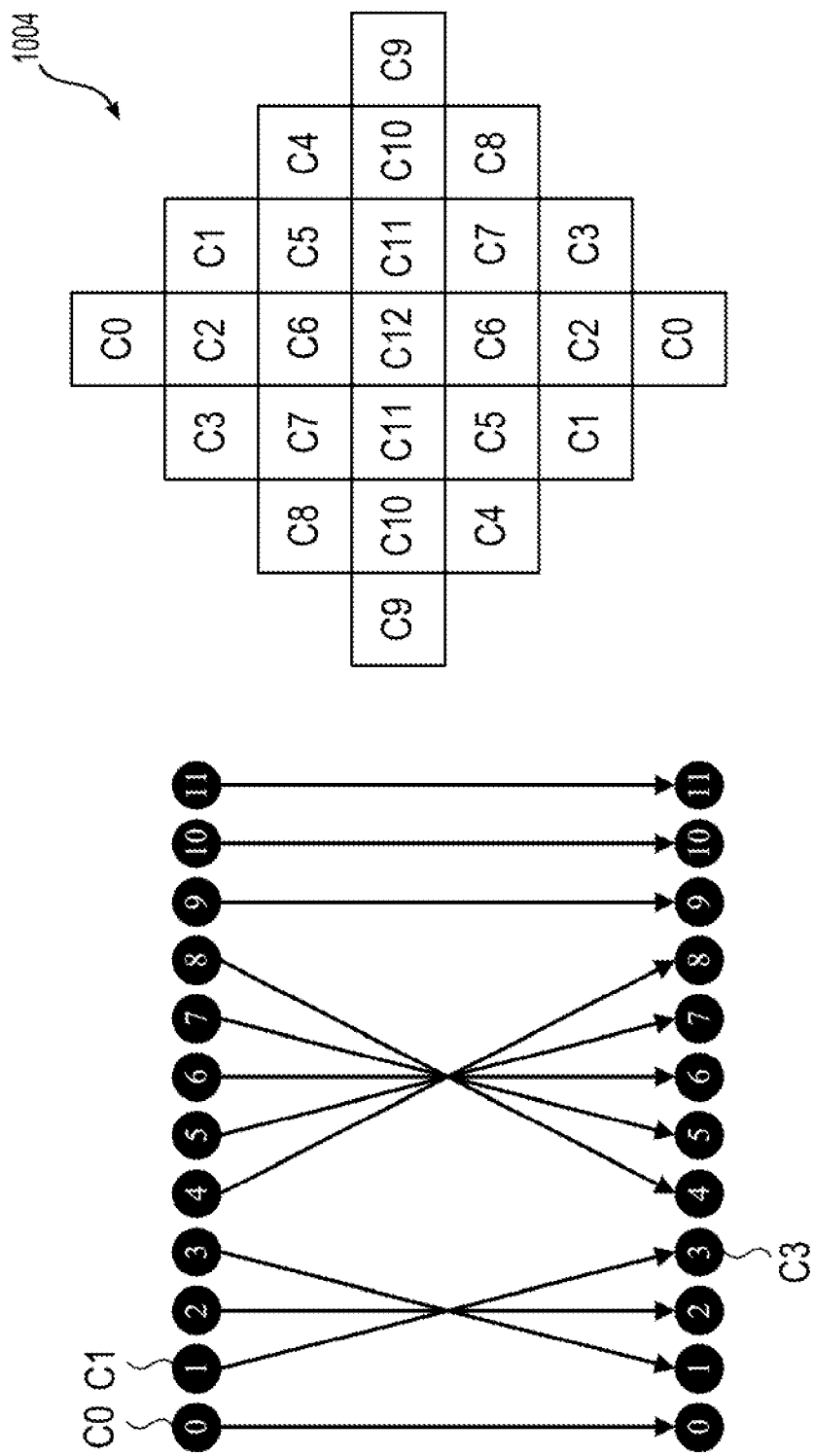
FIG. 10B is a schematic illustration of a second exemplary transposition of coefficients of an ALF in accordance with some embodiments.
Figure 10C:
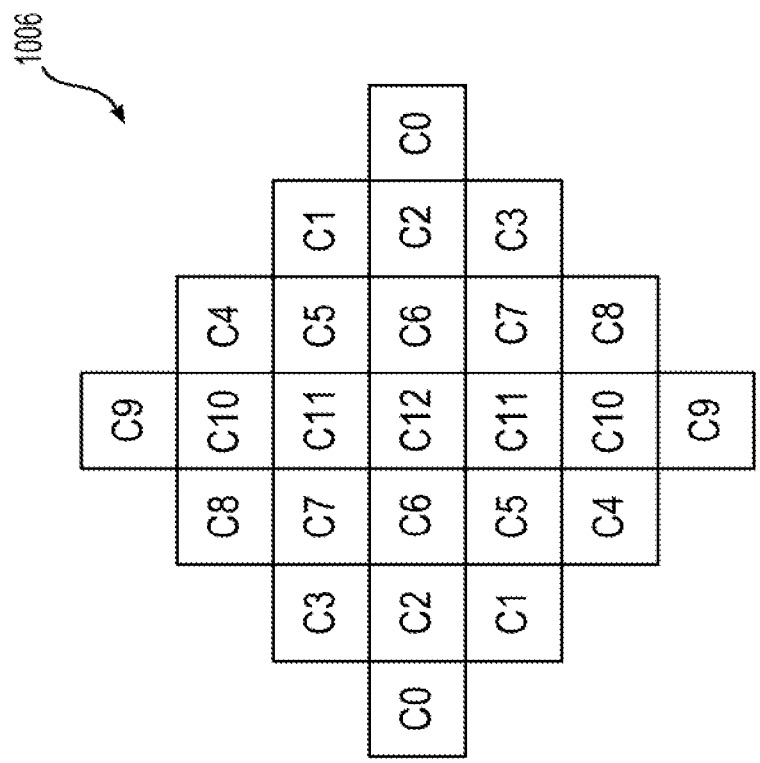
FIG. 10C is a schematic illustration of a third exemplary transposition of coefficients of an ALF in accordance with some embodiments.
Figure 10C:
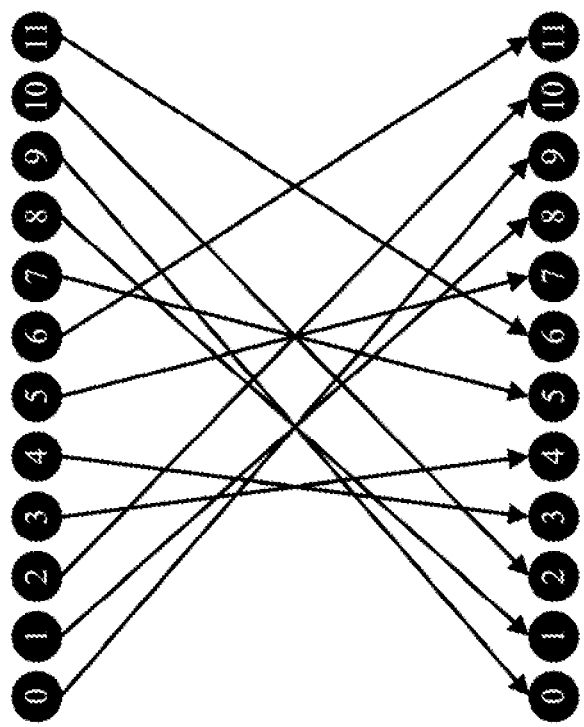

Transpositions based on a diagonal flip, a vertical flip, and a rotation defined by the formulae (1)-(3) and swapping coefficients based on the corresponding transposition can be depicted in FIGS. 10A-10C. FIG. 10A shows an exemplary diagonal flip of coefficients of an ALF (1002). For example, a coefficient C0 can be swapped with a coefficient C9, and a coefficient C2 can be swapped with a coefficient C10. FIG. 10B shows an exemplary vertical flip of coefficients of an ALF (1004). As shown in FIG. 10B, a coefficient C0 can stay in an original position. A coefficient C1 can be swapped with a coefficient C3, for example. FIG. 10C shows an exemplary rotation of coefficients of an ALF (1006).

In some software implementations, ALF filter coefficients can be stored in a contiguous chunk of memory (or a memory space with consecutive blocks) in a decoding order that matches an initial 'no transposition' placement order (e.g., the initial placement in FIG. 9). Before filtering, the coefficients can be transposed in accordance with a specific transposition operation. The transposition operation can be indicated by a transposition index, such as 0, 1, 2, or 3. The transposition index 0 can indicate 'no transposition'. The transposition index 1 can indicate a 'diagonal flip'. The transposition index 2 can indicate a 'vertical flip', and the transposition index 3 can indicate a 'rotation'. The transposition process can be applied frequently in ALF filtering during decoding or encoding in H.266/VVC-compliant codecs. However, transposition can be a series of swaps of coefficients from memory locations in which the coefficients are stored. The transposition may not be SIMD (single instruction/multiple data) friendly, such as when coefficients that are distant from each other in the memory are swapped. For example, if each coefficient has a 16-bit bit depth and all coefficients are stored in a contiguous memory chunk, coefficients that are distant in the contiguous memory chunk (or contiguous chunk of memory) have to be swapped for a diagonal flip or a rotation.

Current AVX architecture of Intel or similar architectures have 256-bit registers that can be split into two lanes. If 12 coefficients (e.g., 12×16 bits=192 bits) are read from a memory into such a register in an initial default arrangement, and are transposed in a vectorized way, then swapping values (or coefficients) across the lanes is required. For example, a $0^{th}$ coefficient for 'diagonal flip' or for 'rotation' may have to be swapped with a $9^{th}$ coefficient, which is located 128 bits away from the $0^{th}$ coefficient. Swapping values across the lanes can be much slower than swapping values inside the lanes, which may be performed with only one SIMD instruction, and may not be performed with only one SIMD instruction. To filter every 4×4 luma block, such as in H.266/VVC, transposition may become a significant time consuming process.

If a diamond-shaped pattern is large, for example larger than that of H.266/VVC ALF, the problem of fast transpositions implemented in a vectorized SIMD form can become much more difficult. Such ALF designs were proposed earlier and are being studied currently by the JVET group as new video coding algorithms for better compression. Embodiments of the disclosure can be used to efficiently address cases with a large diamond-shaped pattern.

Figure 11:
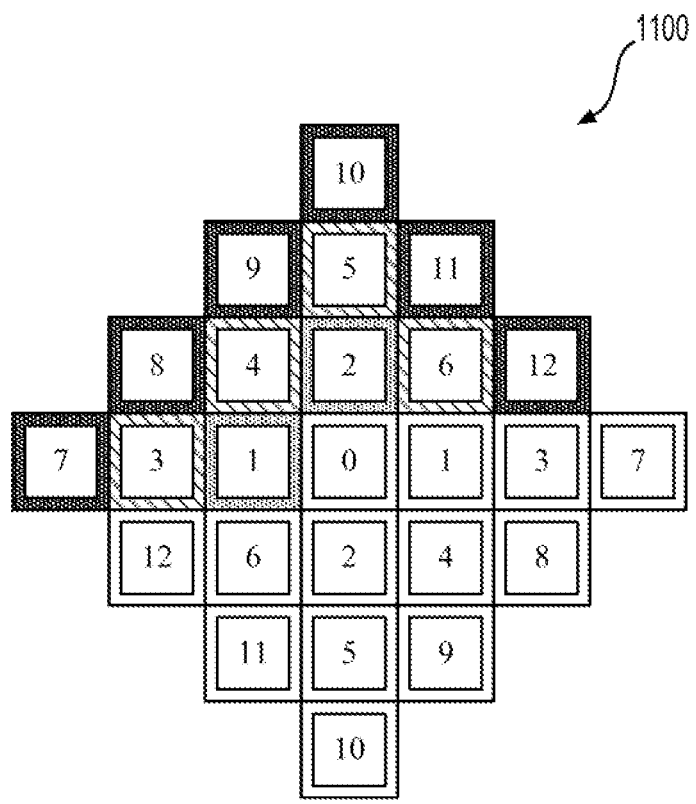
FIG. 11 is a schematic illustration of grouping coefficients of an ALF in accordance with some embodiments.

In the disclosure, ALF coefficients can be placed into a contiguous chunk of memory in a specially designed order. For example, subsets of the ALF coefficients that are to be swapped can be placed (or grouped) close to each other in the contiguous memory. Grouping the ALF coefficients can be implemented as a placement of a coefficient at a time of decoding, or before a filtering process but after decoding the coefficients in an order. The order may be defined by a coding standard, such as by H.266/VVC standard. One exemplary pre-arrangement of the ALF coefficients with a desired property can be shown in FIG. 11. As shown in FIG. 11, coefficients of an ALF filter (1100) can be grouped. The ALF filter (1100) can have a diamond shape and include coefficients C0-C12, where C0 can be labelled as "0" and C1 can be labelled as "1" for example. C0 can be positioned at a center position of the ALF filter (1100). The coefficients C1-C12 can be arranged into a plurality of groups. In an example of FIG. 11, the coefficients C1-C12 can be arranged into 3 groups. The coefficients C1-C2 can be arranged as a first group, the coefficients C3-C6 can be arranged into a second group, and the coefficients C7-C12 can be arranged into a third group. Further, transposition (e.g., rotation, vertical flip, and diagonal flip) can be performed on a group. The same or different combinations of transposition can be performed on the groups.

A common property of a set of defined transpositions (e.g., rotation, vertical flip, and diagonal flip) can be applied to swap only coefficients that are on a same distance from a center of a pattern of an ALF filter. For example, coefficients shown in FIG. 11 can be placed initially in an order with which 'diagonal flip', 'vertical flip', or 'rotation' can be performed. Then a group (or subset) of the coefficients can be swapped. The group of the coefficients can be located not farther than a certain number of coefficients from each other, based on a bit depth of each coefficient for example. In an example, the group of coefficients can be located not farther than 3 coefficients from each other, or not more than 48 bits if a bit depth of each coefficient is 16 bits and the coefficients are placed in a contiguous chunk of memory. The group of the coefficients that are swapped can be placed in a 128-bit register or into one lane of a 256-bit register in an AVX architecture. Accordingly, a single SIMD instruction can be applied to swap the group of the coefficients. By grouping coefficients that are located within a certain distance from each other and placing the group of the coefficients in a 128-bit register or in a lane of a 256-bit register, transposition can be performed much faster than widely used architectures. Thus, the defined transpositions may be implemented in software while minimizing a number of SIMD instructions.

Figure 12A:
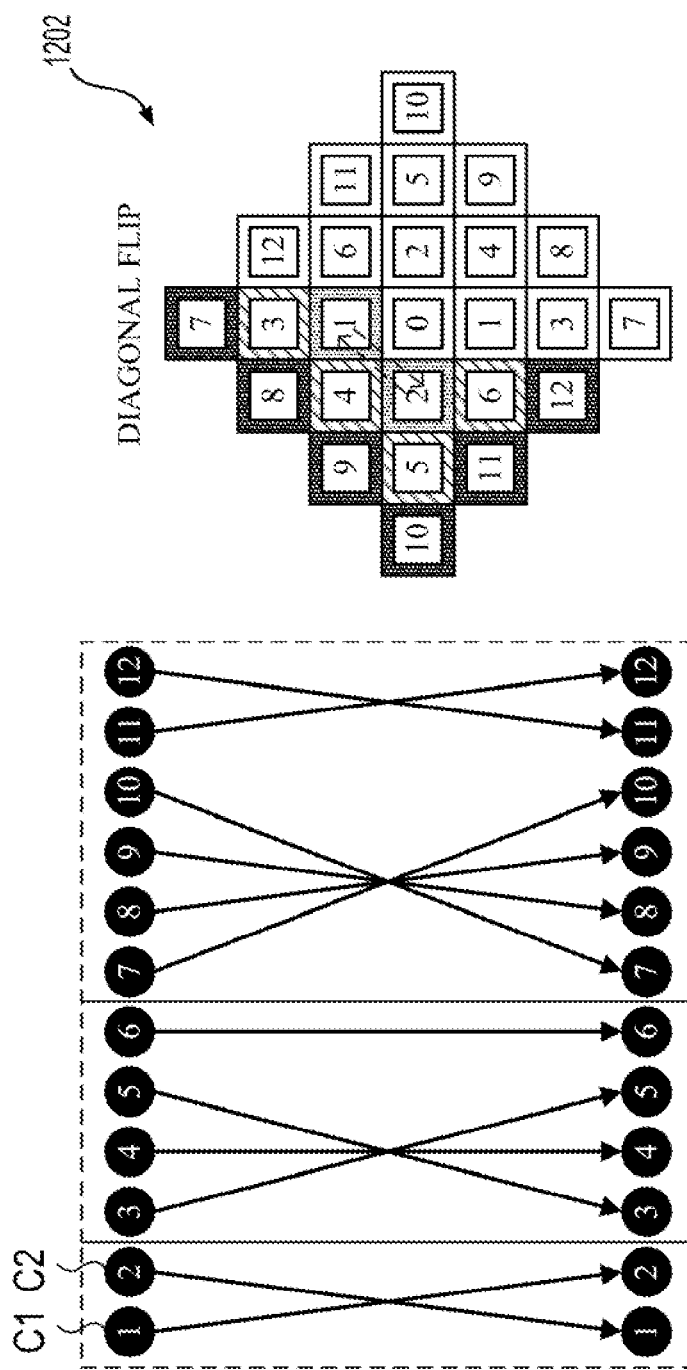
FIG. 12A is a schematic illustration of a first exemplary transposition of grouped coefficients of an ALF in accordance with some embodiments.
Figure 12B:
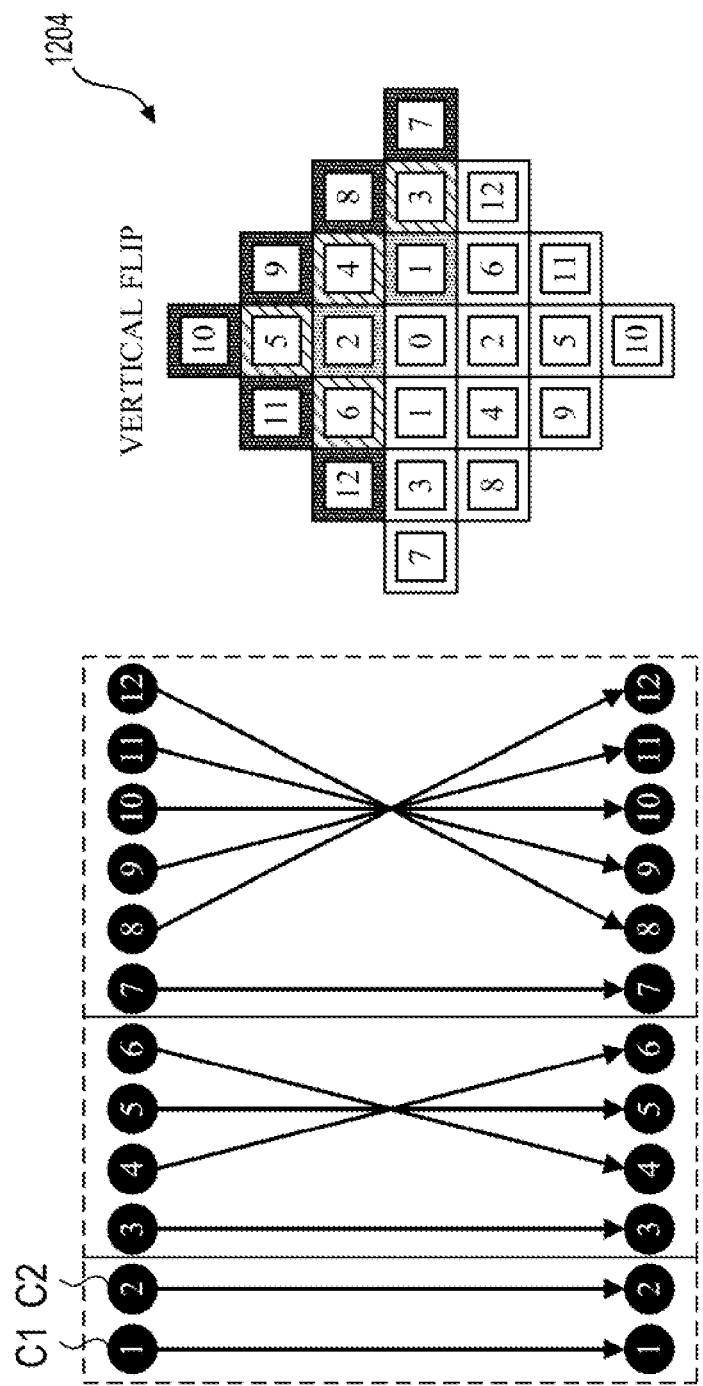
FIG. 12B is a schematic illustration of a second exemplary transposition of grouped coefficients of an ALF in accordance with some embodiments.
Figure 12C:
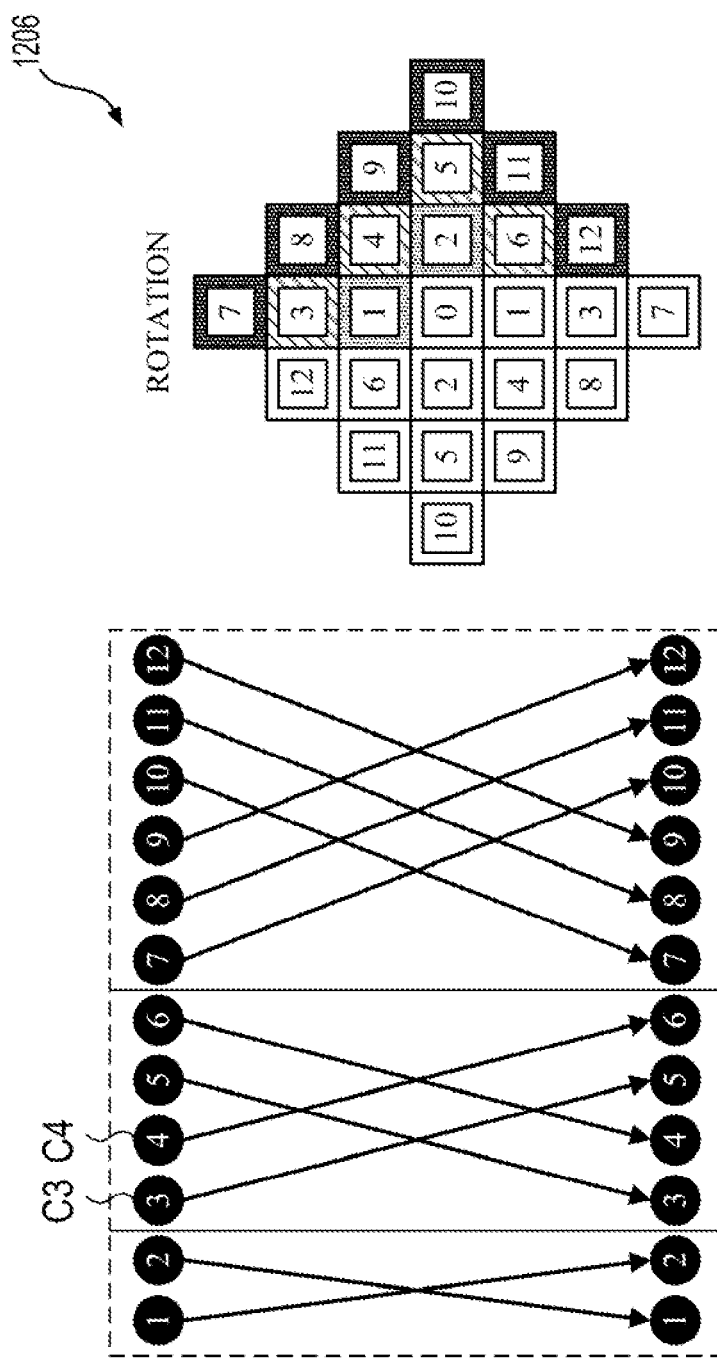
FIG. 12C is a schematic illustration of a third exemplary transposition of grouped coefficients of an ALF in accordance with some embodiments.

FIGS. 12A, 12B, and 12C show exemplary ALF transpositions (e.g., 'diagonal flip', 'vertical flip', and 'rotation') with a proposed initial placement of ALF coefficients, such as the ALF coefficients provided in FIG. 11. FIG. 12A shows an ALF (1202) on which a diagonal flip is performed. As shown in FIG. 12A, coefficients C1-C12 of the ALF (1202) can include three groups. Group 1 can include C1-C2, group 2 can include C3-C6, and group 3 can include C7-C12. Compared with the groups in FIG. 11, each group in FIG. 12A can have a different arrangement (or placement) of the coefficients from the corresponding group in FIG. 11 due to the applied transposition (e.g., the diagonal flip). For example, the coefficients C1-C2 of the group 1 in FIG. 12A can have different positions from the coefficients C1-C2 of the group 1 in FIG. 11. Still referring to FIG. 12A, the diagonal flip can be performed on the coefficients of each group. For example, in group 1, the coefficient C1 and the coefficient C2 can be swapped with each other based on the diagonal flip. It should be noted that coefficients of two groups may not be swapped in some examples.

FIG. 12B shows an ALF (1204) on which a vertical flip is performed. As shown in FIG. 12B, coefficients C1-C12 of the ALF (1204) can include three groups. Group 1 can include C1-C2, group 2 can include C3-C6, and group 3 can include C7-C12. Compared with the groups in FIG. 12A, each group in FIG. 12B can have a different arrangement (or placement) of the coefficients from the corresponding group in FIG. 12A due to the applied transposition (e.g., the vertical flip). For example, the coefficients C1-C2 of the group 1 in FIG. 12B can have different positions from the coefficients C1-C2 of the group 1 in FIG. 12A. Still referring to FIG. 12B, the vertical flip can be performed on the coefficients of each group. For example, in group 1, the coefficient C1 and the coefficient C2 can remain in their original positions based on the vertical flip.

FIG. 12C shows an ALF (1206) on which a rotation is performed. As shown in FIG. 12C, coefficients C1-C12 of the ALF (1206) can include three groups. Group 1 can include C1-C2, group 2 can include C3-C6, and group 3 can include C7-C12. Compared with the groups in FIGS. 12A and 12B, each group in FIG. 12C can have a different arrangement (or placement) of the coefficients from the corresponding group in FIG. 12A or FIG. 12B due to the applied transposition (e.g., the rotation). For example, the coefficients C1-C2 of the group 1 in FIG. 12C can have different positions from the coefficients C1-C2 of the group 1 in FIG. 12A or FIG. 12B. The rotation can be performed on the coefficients in each group. For example, in group 2, the coefficient C3 and the coefficient C4 can be swapped with each other based on the transposition of rotation.

Figure 13:
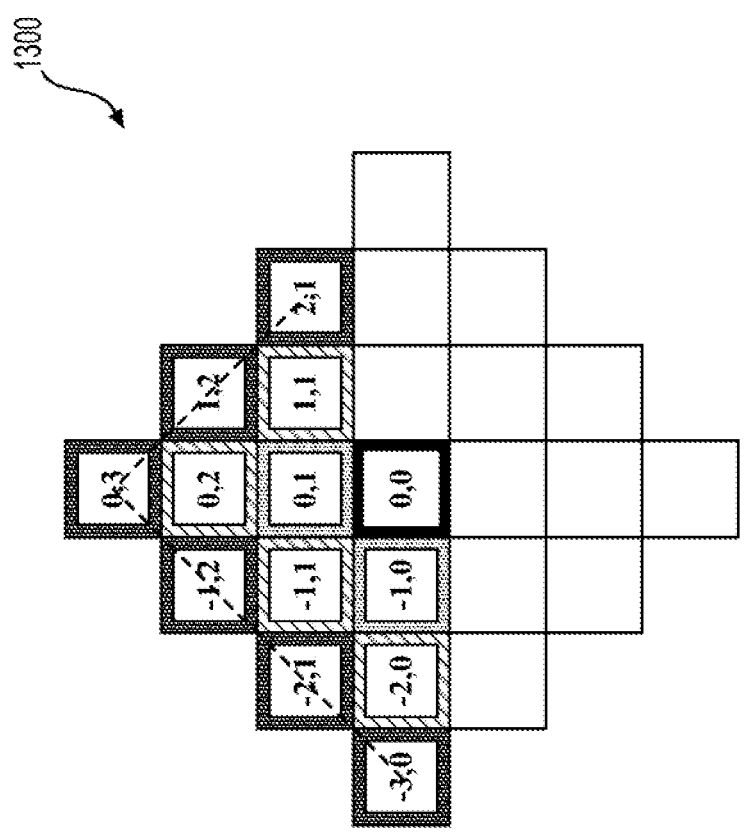
FIG. 13 is a schematic illustration of coordinates of grouped coefficients of an ALF in accordance with some embodiments.

To group coefficients of an ALF, such as a H.266/VVC ALF with a diamond-shaped pattern, a respective pair of indices (or a pair of coordinate values along a first axis and a second axis) (x, y) can be applied to each coefficient. The pair of indices can indicate a position of the coefficient in the ALF. FIG. 13 shows exemplary indices (or coordinate values) of coefficients of an ALF (1300). As shown in FIG.

13, a center coefficient (e.g., co) of the ALF (1300) can have a pair of indices equal to (0,0). Other coefficients of the ALF (1300) can have relative indices (x, y) matching to horizontal and vertical offsets from the center indices (0,0). The ALF (1300) can have a central symmetric pattern (or central symmetric shape). The central symmetric pattern (or center symmetric shape) indicates that coefficient values of the coefficients of the ALF (1300) can follow a function of $c_{x,y}=c_{-x,-y}$. Thus, each of the coefficients of the ALF (1300) can have an opposite/symmetric coefficient with respect to the center coefficient. The respective coefficient and the opposite coefficient of the respective coefficient can be at a same distance from the center coefficient but on opposite sides.

Based on the indices (or coordinate values) of the coefficients, the pre-arrangement shown in FIG. 11 can be provided according to the indices of the coefficients, such as the indices shown in FIG. 13. As shown in FIG. 13, each of the coefficients C7-C12 in a third group of the ALF (1300) can have a respective pair of indices x and y. The index pairs for the coefficients C7-C12 can be {(−3,0), (−2,1), (−1,2), (0,3), (1,2), (2,1)}. A sum of absolute values of x and y for each pair of indices in the third group can be equal to 3 (e.g., $|x|+|y|=3$). Coefficients $c_{x,y}$ with $|x|+|y|=2$ can belong to the second group of the ALF (1300). Index pairs of the coefficients C2-C6 in the second group can be {(−2,0), (−1,1), (0,2), (1,1)}. The first group of the ALF (1300) can contain two coefficients C1-C2. The coefficient C1 and C2 can have an index pair (−1, 0) and an index pair (0,1) respectively. A sum of absolute values of x and y for the index pairs (−1,0) and (0, 1) can be equal to $|x|+[y]=1$.

For each of the ALF transpositions, such as 'diagonal flip', 'vertical flip', and 'rotation', as defined in H266/VVC ALF for example, swapping coefficients of the ALF can be performed only inside each group. In an example, for 'diagonal flip', coefficients can be swapped in pairs as follows in each group of the ALF (1300):

(1) a first group can have 3 swapping pairs: (−3,0) (0,3); (−2,1) (−1,2); (1, 2) (2,1)

(2) a second group can have 1 swapping pair: (−2,0) (0,2)

(3) a third group can have 1 swapping pair: (−1,0) (0, 1).

For transpositions 'vertical flip' and 'rotation', coefficients can also be performed only inside each group.

If each of the groups is stored in a contiguous chunk of computer memory and a coefficient bit depth is 16 bits, then 6 coefficients of the first group can be placed into a 128-bit register or into one lane of a 256-bit register with one packed SIMD load instruction. One packed SIMD shuffle instruction can further be used to perform any defined transposition (e.g., rotation, vertical flip, or diagonal flip). Similarly, six coefficients from the second and third groups can be placed into a 128-bit register or into one lane of a 256-bit register with one SIMD instruction. Alternatively, the coefficients of the first group and the third group can be placed into one 128-bit register or a lane of a 256-bit register, and the second group can be placed into another 128-bit register or another lane of the 256-bit register as shown in Table 1. Again, each of the transpositions may be performed without mixing the registers or lanes. This can help provide a minimal number of SIMD operations to perform the defined transpositions.

TABLE 1

Storage of ALF coefficients in registers.

| | First register, 2 groups | Second register, 1 group |
|---|---|---|
| Double index | (−3, 0) (−2, 1) (−1, 2) (0, 3) (1, 2) (2, 1) (−1, 0) (0, 1) | (−2, 0) (−1, 1) (0, 2) (1, 1)**** |
| Single index | 7, 8, 9, 10, 11, 12, 1, 2 | 3, 4, 5, 6**** |

Note:
*means non-initialized 16-bit space in the register.

For a larger diamond shape with $|x|+|y|>4$, such as ALF patterns on a new video compression technology, 16-bit coefficients $c_{x,y}$ with a same value of $|x|+|y|$ may take more than 128 bits in a contiguous memory. Nevertheless, grouping ALF coefficients of an ALF with a larger diamond shape can still be beneficial.

Figure 14:
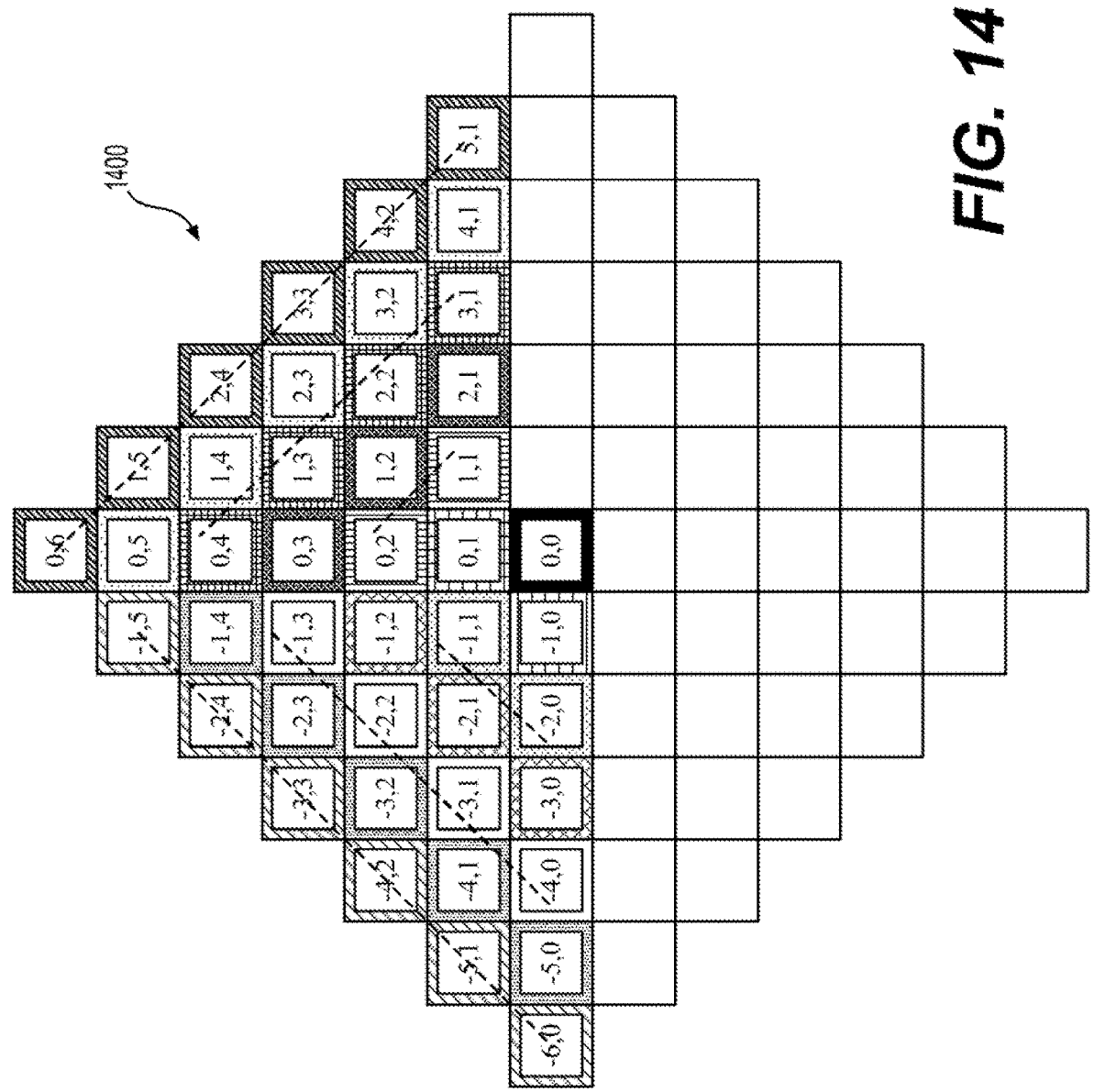
FIG. 14 is a schematic illustration of coordinates of grouped coefficients of an ALF in accordance with some embodiments.

FIG. 14 shows an example of grouping coefficients in an ALF (1400) with a large diamond shape. The ALF (1400) can receive a same set of transpositions as an ALF of H.266/VVC. As shown in FIG. 14, the ALF (1400) can have a diamond pattern that includes 42 coefficients which can be swapped according to the transpositions (e.g., vertical flip, diagonal flip, and rotation).

Placements of the coefficients of the ALF (1400) can be identified with indices (or coordinate values) $c_{x,y}$. The coefficients can be grouped such that coefficients with $|x|+|y|=6$ and x<0 belong to a first group. The coefficients with $|x|+|y|=6$ and x≥0 can belong to a second group. The coefficients with $|x|+[y]=5$ and x<0 can belong to a third group. The coefficients with $|x|+[y]=5$ and x≥0 can belong to a fourth group, and so on. Thus, as shown in FIG. 14, 12 groups in total can be defined. In addition, groups with x<0 can be classified as odd groups, and groups with x≥0 can be classified as even groups. For example, the first group can be an odd group and contain 6 coefficients with indices {(−6,0), (−5,1), (−4,2), (−3,3), (−2, 4), (−1, 5)}. The second group can be an even group and contain 6 coefficients with indices {(0, 6), (1, 5), (2, 4), (3,3), (4, 2), (5, 1)}. Still referring to FIG. 16, each odd group can have a corresponding even group. The odd group and the corresponding even group can have a same number of coefficients and be a same distance (e.g., $|x|+|y|=N$) from a center of the ALF filter. For example, the second group can be a corresponding group to the first group. The fourth group can be a corresponding group to the third group.

For each defined group, coefficients can be shuffled (or reordered) inside each group based on a defined transposition (e.g., 'diagonal flip', 'vertical flip', or 'rotation'). The entire group (e.g., group 1) can be swapped with the corresponding group (e.g., group 2) based on the defined transposition. Thus, every odd group may swap coefficients with a matched (or corresponding) even group only in some examples. In an example, for 'rotation', the coefficients of the group 1 may only be swapped with the coefficients of the group 2. For 'diagonal flip' or 'vertical flip', coefficients can first be shuffled inside each group, then an odd group can swap coefficients with a matched (or corresponding) even group only. The swapping between the odd group and the corresponding even group can be independent from other groups. By swapping the coefficients only in an individual group and between an odd group and a corresponding even group, a vectorized swap can be more efficient.

For a compact storage and a more efficient utilization of 128-bit registers or lanes of 256-bit registers, groups defined above may be stored as follows. Odd groups, such as the group 1 with indices {(−6,0), (−5,1), (−4,2), (−3,3), (−2, 4), (−1, 5)} and group 9 with indices {(−2,0), (−1,1)} may be placed in one 128-bit register. The matched even groups, such as the group 2 with indices {(0,6), (1,5), (2,4), (3,3), (4,2), (5, 1)} and the group 10 with indices {(0,2), (1,1)} may be stored in another 128-bit register. Thus, a full space of a register can be utilized for 16-bit coefficients. A similar technique of combining the groups into registers may be used for other groups: group 3 with 5 16-bit coefficients may be stored with group 7 with 3 16-bit coefficients in one 128-bit register. Eventually, a placement of the coefficients in the 128-bit registers can be shown as follows Table 2:

TABLE 2

Odd and even 128-bit registers for fast vectorized transpositions of ALF containing 42 coefficients.

| Odd registers | Even registers |
|---|---|
| (−6, 0), (−5, 1), (−4, 2), (−3, 3), (−2, 4), (−1, 5), (−2, 0), (−1, 1) | (0, 6), (1, 5), (2, 4), (3, 3), (4, 2), (5, 1), (0, 2), (1, 1) |
| (−5, 0), (−4, 1), (−3, 2), (−2, 3), (−1, 4), (−3, 0), (−2, 1), (−1, 2) | (0, 5), (1, 4), (2, 3), (3, 2), (4, 1), (0, 3), (1, 2), (2, 1) |
| (−4, 0), (−3, 1), (−2, 2), (−1, 3), (−1, 0) | (0, 4), (1, 3), (2, 2), (3, 1), (0, 1) |

Note:
*means non-initialized 16-bit space in register.

Then in every defined transposition, two operations can be involved: (1) vectorized shuffle (e.g., rotation, diagonal flip, or vertical flip) can be applied inside each register and (2) vectorized swap for groups can be implemented between odd and even registers. The two operations can be implemented very efficiently with SIMD instructions on 6 registers that encapsulate all 42 needed 16-bit values.

Figure 15:
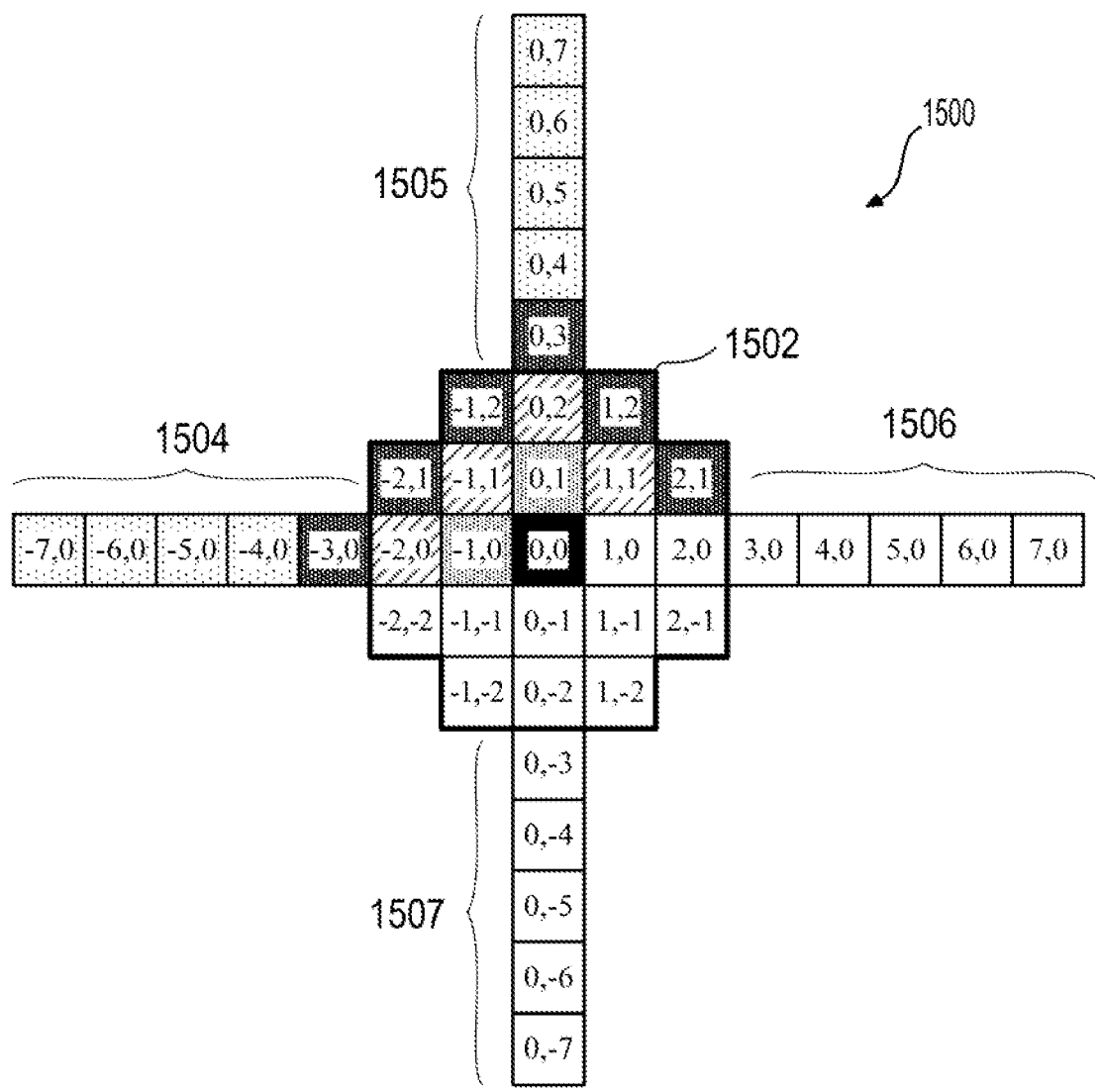
FIG. 15 is a schematic illustration of coordinates of grouped coefficients of an ALF in accordance with some embodiments.

Grouping coefficients that are of a same distance from a center of an ALF can be beneficial for a large ALF filter with a modified central symmetric shape. As shown in FIG. 15, an ALF (1500) can be provided with an example of one modified central symmetric shape. The ALF (1500) can include a part (1502) with a diamond shape, and parts (1504)-(1507) that extend from the sides of the part (1502). The part (1502) can be similar to the ALF (1300) such that coefficients of the part (1502) can be pre-arranged into 3 groups. The parts (1504)-(1507) can extend from four sides of the part (1502) respectively. In some embodiments, the coefficients of the part (1502) can be grouped as coefficients in a diamond shape provided in H.266/VVC. For example, coefficients with indices {(−3,0), (−2,1), (−1,2), (0,3), (1,2), (2,1)} can be grouped as a first group. Coefficients with indices {(−2,0), (−1,1), (0,2), (1,1)} can be grouped as a second group. A third group can include coefficients with indices {(−1,0), (0,−1)}. The remaining 8 coefficients in the parts (1504) and (1505) can be grouped into a fourth group with indices {(−7,0), (−6,0), (−5,0), (−4,0), (0,4), (0,5), (0,6), (0,7)}. The fourth group can fit one 128-bit register and can also be invariant for defined transpositions (e.g., vertical flip, diagonal flip, or rotation).

In the disclosure, grouping coefficients of an ALF according to a distance |x|+|y|=N from a center of the ALF can be applied for a pattern with various shapes, including an arbitrarily large diamond, a truncated diamond, or a central symmetric shape. Transpositions, such as 'diagonal flip', 'vertical flip', 'rotation' transpositions, or any other transpositions that do not change the distance from center to the coefficients can be applied subsequently on the grouped coefficients.

A decoding and/or parsing order of ALF coefficients in a bitstream can match the locality coefficient grouping. Thus, a coefficient of an ALF can be decoded based on grouping information. For example, coefficients of a first group of an ALF can be decoded at first, and coefficients of a second group of the ALF can be decoded subsequently.

A pre-arrangement or a default initial placement can be used in an encoding process for search coefficients among ALF coefficient candidates in an encoder, such as H.266/VVC-compliant encoder. The placement of the decoded ALF coefficients in a contiguous memory chunk can be performed after parsing (or decoding) the ALF coefficients, in a new video encoding and decoding algorithm, or in a device in which transpositions on a central symmetric shape is involved.

The arrangement of coefficients $c_{x,y}$ can be applied on various patterns, such as a diamond pattern, a truncated diamond pattern, or a central symmetric filter pattern with a center coefficient $C_{0,0}$. Defined transpositions can subsequently be applied on the arranged (or grouped) coefficients.

An order of coefficients in a central symmetric shape filter (or filter with a central symmetric shape) can be signaled. According to the signal order, the coefficients of the filter can be grouped in several groups. Coefficients $c_{x,y}$ in each group can have a same distance |x|+|y|=N from a center of the central symmetric shape filter.

In some embodiments, coefficients of each group can be placed into a contiguous memory chunk (or a contiguous chunk of memory). Coefficients of a group can be shuffled (or reordered) with each other based on a defined transposition (e.g., vertical flip, diagonal flip, or rotation). Thus, coefficients from another group may not be swapped with any coefficient of the group for any defined transposition. Accordingly, the coefficients of the group can still remain within the group and be stored within a same contiguous memory.

In some embodiments, coefficient grouping can be performed so that coefficients of an ALF can be arranged into an even number of groups. The even number of groups can be split into two disjoint sets: a first set and a second set. For each defined transposition, each group from the first set may swap coefficients with a matching (or corresponding) group from the second set. The groups in the first set can have N coefficients $c_{x,y}$ with indices x such that −N≤x<0 and the groups in the second set can have N coefficients with indices x such that 0≤x<N. The first set and the second set can include a same number of groups. Each group in the first set can have a matching (or corresponding) group in the second set. The group in the first set and the corresponding group in the second set can have a same number of coefficients and be a same distance from a center of the ALF. For a defined transposition, one or more coefficients of a group of the first set can be swapped with one or more coefficients from the matching group in the second set.

In some embodiments, coefficients of each group can be placed inside a contiguous chunk of memory so that every chunk (or block) of the contiguous memory is not larger than a storage volume, such as 128 bits.

In some embodiments, coefficients of several groups can be stored in a chunk of contiguous memory, such as a 128-bit chunk of contiguous memory.

In some embodiments, coefficients of each group can be placed inside a contiguous chunk of memory so that each chunk of the memory is not larger than a storage volume, such as 256 bits.

In some embodiments, coefficients of several groups can be stored in a chunk of contiguous memory, such as a 256-bit chunk of contiguous memory.

In some embodiments, grouping coefficients of an ALF can be performed immediately after decoding the ALF coefficients in an arbitrary signaled order (e.g., an order of the coefficients shown in FIG. 9). Thus, coefficients of an ALF can be decoded based on a signaled order. The coefficients can further be grouped subsequently.

In some embodiments, grouping coefficients of an ALF can be performed immediately after decoding the ALF coefficients in a H.266/VVC decoding order. For example, coefficients can be decoded in an order from a $0^{th}$ (e.g., C0) to an $11^{th}$ (e.g., C11) according to an initial pattern shown in FIG. 9. The coefficients can further be grouped subsequently.

In some embodiments, grouping coefficients of an ALF can be performed before a search for the best (or selected) ALF coefficients on a central symmetric pattern in an encoder. For example, a transposition (e.g., vertical flip, diagonal flip, or rotation) can first be determined. A transposition index indicating the determined transposition can be signaled accordingly. Positions of the coefficients of the ALF can be grouped based on the determined transposition. Further, coefficients of the ALF can be determined from candidate coefficients based on a search process. The best (or selected) ALF coefficients can be determined by minimizing a prediction error based on a covariance matrix (or cost value), such as a covariance matrix applied in a formula of a mean square error (MSE) of a Wiener filter. For each transposition, a respective search can be performed to find best ALF coefficients from candidate coefficients.

In some embodiments, grouping coefficients of an ALF can be implemented based on pixel data of a block in matching positions (e.g., the positions corresponding to the filter coefficients) on a central symmetric pattern before a search for the best ALF coefficients in an encoder.

In some embodiments, grouping of coefficients of an ALF with a central symmetric shape, such as a diamond shape, can be implemented before search for the best ALF coefficients in an encoder, such as in a H.266/VVC compliant encoder.

In some embodiments, grouping coefficients of an ALF with a central symmetric shape, such as a diamond shape, can be implemented based on pixel values of a block in matching positions of filter coefficients on the central symmetric shape before a search for the ALF coefficients in an encoder, such as a H.266/VVC-compliant encoder.

Figure 16:
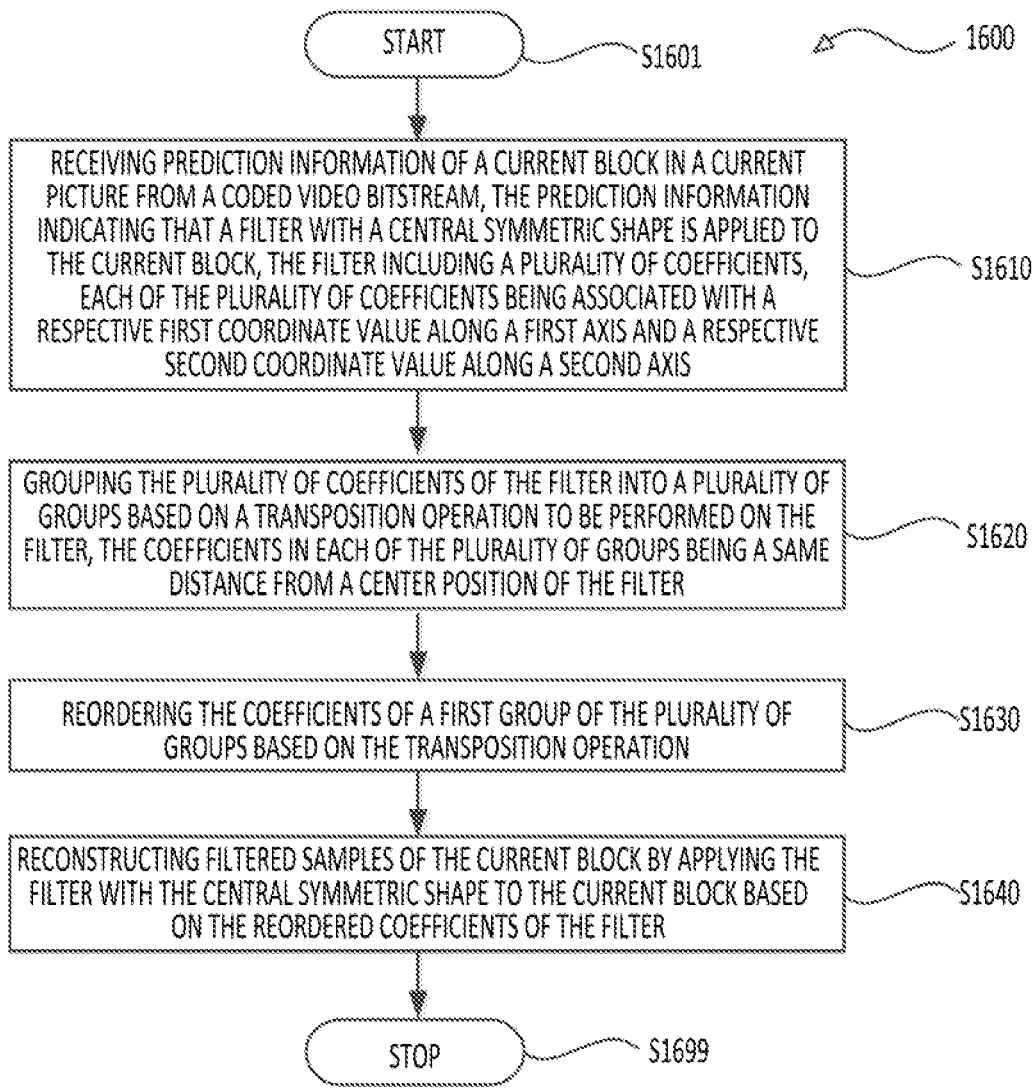
FIG. 16 shows a flow chart outlining an exemplary decoding process according to some embodiments of the disclosure.
Figure 17:
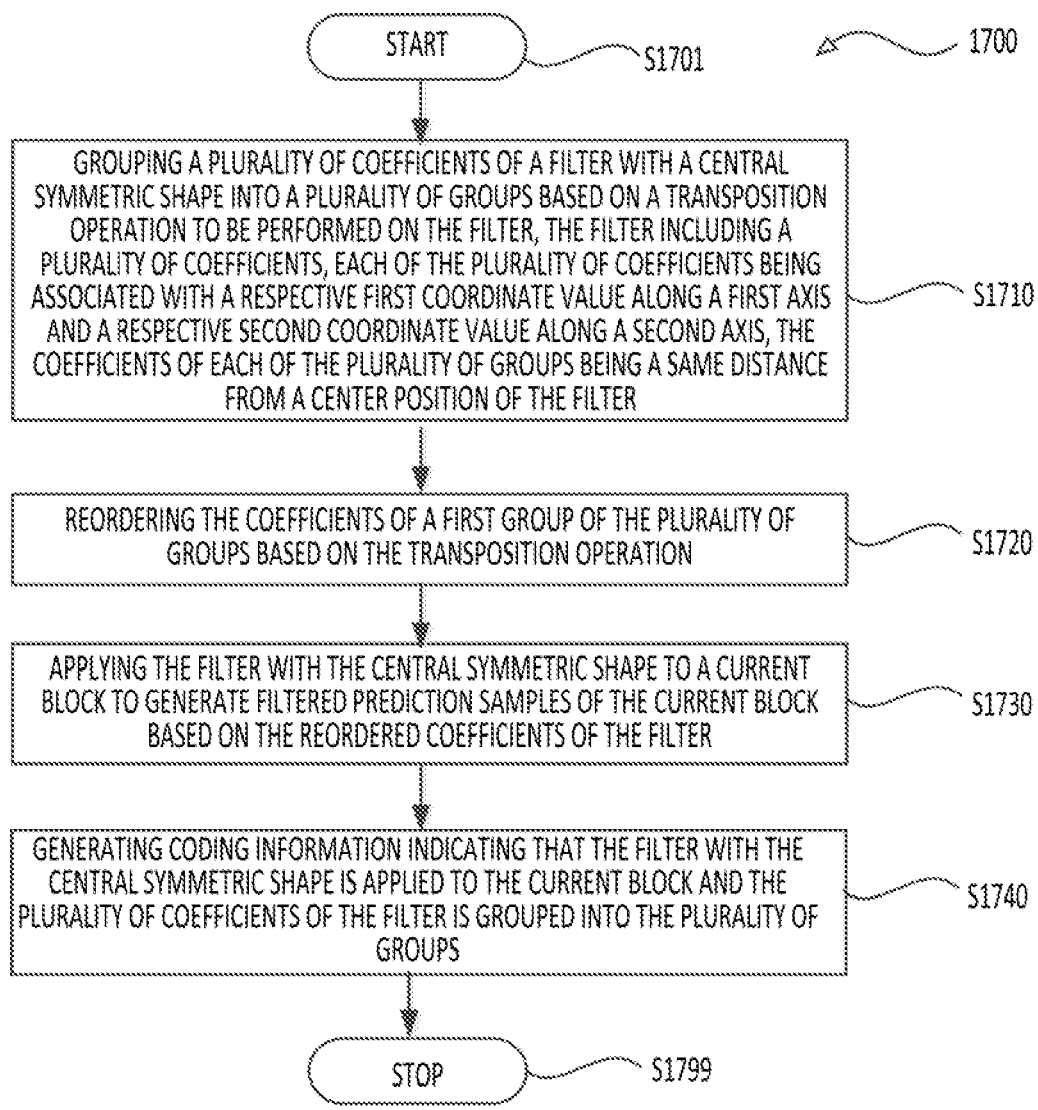
FIG. 17 shows a flow chart outlining an exemplary encoding process according to some embodiments of the disclosure.

FIG. 16 shows a flow chart outlining an exemplary decoding process (1600) according to some embodiments of the disclosure. FIG. 17 shows a flow chart outlining an exemplary encoding process (1700) according to some embodiments of the disclosure. The proposed processes may be used separately or combined in any order. Further, each of the processes (or embodiments), encoder, and decoder may be implemented by processing circuitry (e.g., one or more processors or one or more integrated circuits). In one example, the one or more processors execute a program that is stored in a non-transitory computer-readable medium.

Operations of processes (e.g., (1600) and (1700)) may be combined or arranged in any amount or order, as desired. In embodiments, two or more of the operations of the processes (e.g., (1600) and (1700)) may be performed in parallel.

The processes (e.g., (1600) and (1700)) can be used in the reconstruction and/or encoding of a block, so as to generate a prediction block for the block under reconstruction. In various embodiments, the processes (e.g., (1600) and (1700)) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the processes (e.g., (1600) and (1700)) are implemented in software instructions, thus when the processing circuitry executes the software instructions, the processing circuitry performs the processes (e.g., (1600) and (1700)).

As shown in FIG. 16, the process (1600) can start from (S1601) and proceed to (S1610). At (S1610), prediction information of a current block in a current picture is received from a coded video bitstream. The prediction information indicates that a filter with a central symmetric shape is applied to the current block. The filter includes a plurality of coefficients. Each of the plurality of coefficients is associated with a respective first coordinate value along a first axis and a respective second coordinate value along a second axis.

At (S1620), the plurality of coefficients of the filter is grouped into a plurality of groups based on a transposition operation to be performed on the filter. The coefficients in each of the plurality of groups are a same distance from a center position of the filter.

At (S1630), the coefficients of a first group of the plurality of groups are reordered based on the transposition operation.

At (S1640), filtered samples of the current block are reconstructed by applying the filter with the central symmetric shape to the current block based on the reordered coefficients of the filter.

In the process (1600), the reordered coefficients of the first group of the plurality of groups and the coefficients of a second group of the plurality of groups are swapped. The reordered coefficients of the first group and the coefficients of the second group are a first distance from the center position of the filter.

In an example, the transposition operation is one of a rotation operation, a vertical flip operation, or a diagonal flip operation.

In an example, a number of the coefficients of the first group is equal to a number of the coefficients of the second group.

In an example, the first distance is equal to a sum of (i) an absolute value of the first coordinate value of a first coefficient of the first group and (ii) an absolute value of the second coordinate value of the first coefficient of the first group.

In an example, a sum of the first coordinate value of the first coefficient of the first group and a second coordinate value of a first coefficient of the second group is equal to 0. In an example, the second coordinate value of the first coefficient of the first group is equal to a first coordinate value of the first coefficient of the second group.

In an example, the coefficients of each of the plurality of groups is stored in a respective memory space. In one example, the respective memory space has one of (i) a first storage volume equal to or less than 128 bits and (ii) a second storage volume equal to or less than 256 bits.

In an example, the coefficients of one or more of the plurality of groups are stored in a memory space, the memory space having one of (i) a first storage volume of 128 bits and (ii) a second storage volume of 256 bits.

In an example of the process (1600), each of the plurality of groups has a corresponding group in the plurality of groups. The coefficients of the respective group of the plurality of groups and the coefficients of the corresponding group in the plurality of groups are a same distance from the center position of the filter. The respective group of the plurality of groups and the corresponding group in the plurality of groups include a same number of coefficients.

In an example of the process (1600), the plurality of coefficients of the filter are determined based on the prediction information in an order signaled in the prediction information. The determined plurality of coefficients of the filter are further be grouped into the plurality of groups.

The process (1600) can be suitably adapted. Step(s) in the process (1600) can be modified and/or omitted. Additional step(s) can be added. Any suitable order of implementation can be used.

As shown in FIG. 17, the process (1700) can start from (S1701) and proceed to (S1710). At (S1710), a plurality of coefficients of a filter with a central symmetric shape are grouped into a plurality of groups based on a transposition operation to be performed on the filter. The filter includes a plurality of coefficients. Each of the plurality of coefficients is associated with a respective first coordinate value along a first axis and a respective second coordinate value along a second axis. The coefficients of each of the plurality of groups are a same distance from a center position of the filter.

At (S1720), the coefficients of a first group of the plurality of groups are reordered based on the transposition operation.

At (S1730), the filter with the central symmetric shape are applied to a current block to generate filtered prediction samples of the current block based on the reordered coefficients of the filter.

At (1740), coding information is generated. The coding information indicates that the filter with the central symmetric shape is applied to the current block and the plurality of coefficients of the filter is grouped into the plurality of groups.

Then, the process proceeds to (S1799) and terminates.

The process (1700) can be suitably adapted. Step(s) in the process (1700) can be modified and/or omitted. Additional step(s) can be added. Any suitable order of implementation can be used.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
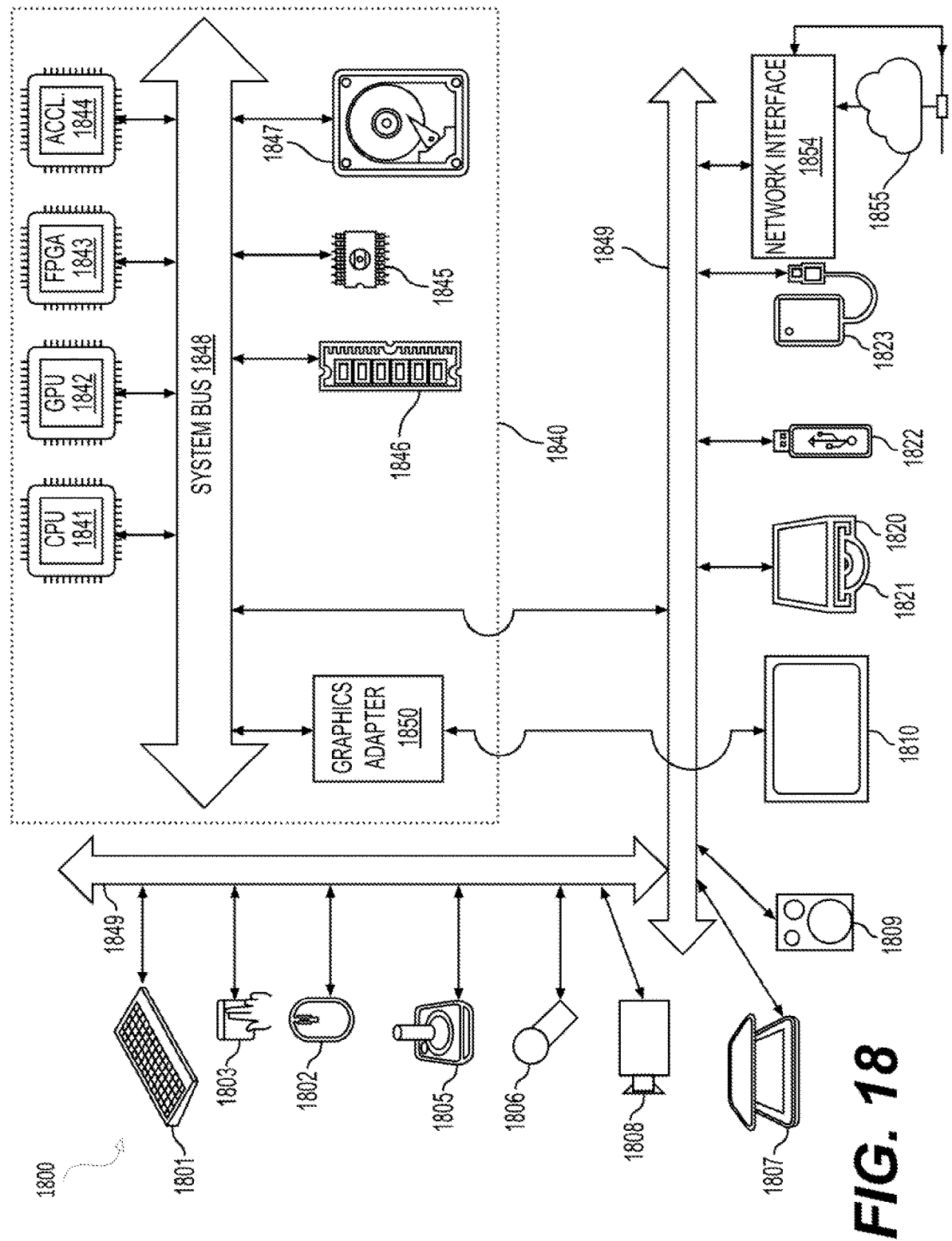
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
 ALF: Adaptive Loop Filter
 AVX: Advanced Vector Extensions Architecture
 JVET: Joint Video Exploration Team
 SIMD: Single Instruction Multiple Data Architecture
 H.266/VVC: Versatile Video Coding Standard
 JEM: joint exploration model
 VVC: versatile video coding
 BMS: benchmark set
 MV: Motion Vector
 HEVC: High Efficiency Video Coding
 SEI: Supplementary Enhancement Information
 VUI: Video Usability Information
 GOPs: Groups of Pictures
 TUs: Transform Units,
 PUs: Prediction Units
 CTUs: Coding Tree Units
 CTBs: Coding Tree Blocks
 PBs: Prediction Blocks
 HRD: Hypothetical Reference Decoder
 SNR: Signal Noise Ratio
 CPUs: Central Processing Units
 GPUs: Graphics Processing Units
 CRT: Cathode Ray Tube
 LCD: Liquid-Crystal Display
 OLED: Organic Light-Emitting Diode
 CD: Compact Disc
 DVD: Digital Video Disc
 ROM: Read-Only Memory
 RAM: Random Access Memory
 ASIC: Application-Specific Integrated Circuit
 PLD: Programmable Logic Device
 LAN: Local Area Network
 GSM: Global System for Mobile communications
 LTE: Long-Term Evolution
 CANBus: Controller Area Network Bus
 USB: Universal Serial Bus
 PCI: Peripheral Component Interconnect
 FPGA: Field Programmable Gate Areas
 SSD: solid-state drive
 IC: Integrated Circuit
 CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
 receiving prediction information of a current block in a current picture from a coded video bitstream, the prediction information indicating that a filter with a central symmetric shape is applied to the current block, the filter including a plurality of coefficients, each of the plurality of coefficients being associated with a respective first coordinate value along a first axis and a respective second coordinate value along a second axis;

grouping the plurality of coefficients of the filter into a plurality of groups based on a transposition operation to be performed on the filter, the coefficients in each of the plurality of groups being a same distance from a center position of the filter and stored in a respective same chunk of contiguous memory;

reordering the coefficients of a first group of the plurality of groups based on the transposition operation; and reconstructing filtered samples of the current block by applying the filter with the central symmetric shape to the current block based on the reordered coefficients of the filter.

2. The method of claim 1, further comprising:
swapping the reordered coefficients of the first group of the plurality of groups and the coefficients of a second group of the plurality of groups, the reordered coefficients of the first group and the coefficients of the second group being a first distance from the center position of the filter.

3. The method of claim 2, wherein:
a number of the coefficients of the first group is equal to a number of the coefficients of the second group.

4. The method of claim 2, wherein:
the first distance is equal to a sum of (i) an absolute value of the first coordinate value of a first coefficient of the first group and (ii) an absolute value of the second coordinate value of the first coefficient of the first group.

5. The method of claim 2, wherein:
a sum of the first coordinate value of the first coefficient of the first group and the second coordinate value of a first coefficient of the second group is equal to 0, and
the second coordinate value of the first coefficient of the first group is equal to the first coordinate value of the first coefficient of the second group.

6. The method of claim 1, wherein the transposition operation is one of a rotation operation, a vertical flip operation, or a diagonal flip operation.

7. The method of claim 1, wherein:
the coefficients of each of the plurality of groups are stored in a respective memory space, the respective memory space having one of (i) a first storage volume equal to or less than 128 bits and (ii) a second storage volume equal to or less than 256 bits.

8. The method of claim 1, wherein:
the coefficients of one or more of the plurality of groups are stored in a memory space, the memory space having (i) a first storage volume of 128 bits or (ii) a second storage volume of 256 bits.

9. The method of claim 1, wherein:
each of the plurality of groups is associated with a corresponding group in the plurality of groups, the coefficients of the respective group of the plurality of groups and the coefficients of the corresponding group in the plurality of groups being a same distance from the center position of the filter, and
the respective group of the plurality of groups and the corresponding group in the plurality of groups include a same number of coefficients.

10. The method of claim 1, further comprising:
determining the plurality of coefficients of the filter based on the prediction information in an order signaled in the prediction information; and
grouping the determined plurality of coefficients of the filter into the plurality of groups.

11. A method of video encoding performed in a video encoder, the method comprising:
grouping a plurality of coefficients of a filter with a central symmetric shape into a plurality of groups based on a transposition operation to be performed on the filter, each of the plurality of coefficients being associated with a respective first coordinate value along a first axis and a respective second coordinate value along a second axis, and the coefficients in each of the plurality of groups being a same distance from a center position of the filter and stored in a respective same chunk of contiguous memory;

reordering the coefficients of a first group of the plurality of groups based on the transposition operation;

applying the filter with the central symmetric shape to a current block in a current picture based on the reordered coefficients of the filter; and encoding, in a bitstream, coding information indicating that the filter with the central symmetric shape is applied to the current block.

12. The method of claim 11, further comprising:
swapping the reordered coefficients of the first group of the plurality of groups and the coefficients of a second group of the plurality of groups, the reordered coefficients of the first group and the coefficients of the second group being a first distance from the center position of the filter.

13. The method of claim 12, wherein:
a number of the coefficients of the first group is equal to a number of the coefficients of the second group.

14. The method of claim 12, wherein:
the first distance is equal to a sum of (i) an absolute value of the first coordinate value of a first coefficient of the first group and (ii) an absolute value of the second coordinate value of the first coefficient of the first group.

15. The method of claim 12, wherein:
a sum of the first coordinate value of the first coefficient of the first group and the second coordinate value of a first coefficient of the second group is equal to 0, and
the second coordinate value of the first coefficient of the first group is equal to the first coordinate value of the first coefficient of the second group.

16. The method of claim 11, wherein the transposition operation is one of a rotation operation, a vertical flip operation, or a diagonal flip operation.

17. The method of claim 11, wherein:
the coefficients of each of the plurality of groups are stored in a respective memory space, the respective memory space having one of (i) a first storage volume equal to or less than 128 bits and (ii) a second storage volume equal to or less than 256 bits.

18. The method of claim 11, wherein:
the coefficients of one or more of the plurality of groups are stored in a memory space, the memory space having (i) a first storage volume of 128 bits or (ii) a second storage volume of 256 bits.

19. The method of claim 11, wherein:
each of the plurality of groups is associated with a corresponding group in the plurality of groups, the coefficients of the respective group of the plurality of groups and the coefficients of the corresponding group in the plurality of groups being a same distance from the center position of the filter, and the respective group of the plurality of groups and the corresponding group in the plurality of groups include a same number of coefficients.

20. A method of processing visual media data, the method comprising:

processing a bitstream that includes the visual media data according to a format rule, wherein the bitstream includes prediction information of a current block in a current picture, the prediction information indicating that a filter with a central symmetric shape is applied to the current block, the filter including a plurality of coefficients, each of the plurality of coefficients being associated with a respective first coordinate value along a first axis and a respective second coordinate value along a second axis; and the format rule specifies that the plurality of coefficients of the filter is grouped into a plurality of groups based on a transposition operation to be performed on the filter, the coefficients in each of the plurality of groups being a same distance from a center position of the filter and stored in a respective same chunk of contiguous memory;

the coefficients of a first group of the plurality of groups are reordered based on the transposition operation; and filtered samples of the current block are processed by applying the filter with the central symmetric shape to the current block based on the reordered coefficients of the filter.

* * * * *